(12) United States Patent
Morimoto

(10) Patent No.: US 7,441,470 B2
(45) Date of Patent: *Oct. 28, 2008

(54) STRAIN GAUGE TYPE SENSOR AND STRAIN GAUGE TYPE SENSOR UNIT USING THE SAME

(75) Inventor: Hideo Morimoto, Yamatokooriyama (JP)

(73) Assignee: Nitta Corporation, Osaka (JP)

(*) Notice: Subject to any disclaimer, the term of this patent is extended or adjusted under 35 U.S.C. 154(b) by 234 days.

This patent is subject to a terminal disclaimer.

(21) Appl. No.: 10/578,729

(22) PCT Filed: Jun. 21, 2004

(86) PCT No.: PCT/JP2004/008720

§ 371 (c)(1),
(2), (4) Date: May 10, 2006

(87) PCT Pub. No.: WO2005/045388

PCT Pub. Date: May 19, 2005

(65) Prior Publication Data

US 2007/0089536 A1 Apr. 26, 2007

(30) Foreign Application Priority Data

Nov. 10, 2003 (JP) ............................. 2003-379686

(51) Int. Cl.
*G01L 1/22* (2006.01)
(52) U.S. Cl. .................... 73/862.045; 73/862.044; 338/5

(58) Field of Classification Search ............ 73/862.044, 73/862.045; 338/5
See application file for complete search history.

(56) References Cited

U.S. PATENT DOCUMENTS 3,213,400 A * 10/1965 Gieb ............................ 338/4

(Continued)

FOREIGN PATENT DOCUMENTS

JP 63-12930 1/1988

(Continued)

OTHER PUBLICATIONS

J. Johnston and K. Coffey. "Getting the most out of Strain Gauge Load Cells" Sensors. May 2000. Accessed online on Feb. 19, 2008 <http://archives.sensorsmag.com/articles/0500/52/index.htm>.*

(Continued)

*Primary Examiner*—Edward Lefkowitz
*Assistant Examiner*—Punam Patel
(74) *Attorney, Agent, or Firm*—Osha • Liang LLP

(57) ABSTRACT

A strain gauge type sensor and a strain gauge type sensor unit using the sensor are improved in sensitivity. In a strain gauge type sensor 1 for measuring at least one of multiaxial force, moment, acceleration, and angular acceleration, externally applied, diaphragms 15 and 16 different in thickness are formed at inner and outer edges of a substantially disk-shaped interconnecting portion 13 interconnecting a vicinity of an upper end of a force receiving portion 11 and a fixed portion 12 disposed around the force receiving portion 11. The thicknesses of the diaphragms 15 and 16 are determined such that strains at intersections of a straight line extending through an origin O with the diaphragms 15 and 16 are equal to each other. Strain gauges are disposed at the intersections of the straight line extending through the origin O with the diaphragms 15 and 16.

16 Claims, 21 Drawing Sheets

U.S. PATENT DOCUMENTS

| | | | |
|---|---|---|---|
| 3,456,226 A * | 7/1969 | Vick | 338/2 |
| 5,035,148 A * | 7/1991 | Okada | 73/862.044 |
| 6,005,199 A | 12/1999 | Harada et al. | |
| 6,523,423 B1 * | 2/2003 | Namerikawa et al. | 73/862.391 |
| 6,595,063 B1 * | 7/2003 | Rogne et al. | 73/715 |

FOREIGN PATENT DOCUMENTS

| | | |
|---|---|---|
| JP | 63-21530 | 1/1988 |
| JP | 63-21531 | 1/1988 |
| JP | 63-75533 | 4/1988 |
| JP | 63-111677 | 5/1988 |
| JP | 63-113328 | 5/1988 |
| JP | 3-20635 | 1/1991 |
| JP | 4-194634 | 7/1992 |
| JP | 2527551 | 8/1996 |
| JP | 2514974 | 10/1996 |
| JP | 2581820 | 11/1996 |

OTHER PUBLICATIONS

European Search Report for European Application No. 04746189.2-1236, mailed on Feb. 6, 2007 (3 pages).

esp@cenet abstract for Japanese Publication No. 63075533, Publication date Apr. 5, 1988 (1 page).

esp@cenet abstract for Japanese Publication No. 63111677, Publication date May 16, 1988 (1 page).

esp@cenet abstract for Japanese Publication No. 63012930, Publication date Jan. 20, 1988 (1 page).

esp@cenet abstract for Japanese Publication No. 63021530, Publication date Jan. 29, 1988 (1 page).

esp@cenet abstract for Japanese Publication No. 63021531, Publication date Jan. 29, 1988 (1 page).

International Search Report for PCT/JP2004/008720 dated Sep. 28, 2004 (2 pages).

* cited by examiner

PRIOR ART

PRIOR ART

PRIOR ART

PRIOR ART

STRAIN GAUGE TYPE SENSOR AND STRAIN GAUGE TYPE SENSOR UNIT USING THE SAME

TECHNICAL FIELD

The present invention relates to a strain gauge type sensor capable of measuring at least one of multiaxial force, moment, acceleration, and angular acceleration, externally applied; and also to a strain gauge type sensor unit using the sensor.

BACKGROUND ART

As a strain gauge type sensor known is a device in which a force or moment is detected by using a semiconductor single crystal substrate. As shown in FIGS. 16 and 17, Patent Document 1 discloses a strain gauge type sensor 500 including a strain generation body 510 made up of a substantially columnar force receiving portion 511 provided at the center, a fixed portion 512 provided around the force receiving portion 511, and an annular diaphragm portion 513 connecting the force receiving portion 511 and the fixed portion 512 to each other; and strain gauges R511 to R534 each made of a piezoresistive element and attached to the strain generation body 510.

The strain gauges R511 to R534 are attached to the upper surface of the strain generation body 510. In this example, the origin O is defined at the point at which the central axis of the force receiving portion 511 intersects with the upper surface of the strain generation body 510. The X- and Y-axes are defined as two axes that extend perpendicularly to each other on the upper surface of the strain generation body 510 through the origin O. In addition, an oblique axis S is defined on the upper surface of the strain generation body 510 so as to extend through the origin O differently from any of the X- and Y-axes. The strain gauges R511 to R534 are disposed on the respective axes near the outer and inner edges of the diaphragm portion 513.

In the strain gauge type sensor 500, the strain gauges R511 to R534 constitute bridge circuits for measuring three-axial forces or moments on the X-, Y-, and Z-axes applied to the force receiving portion 511. More specifically, the strain gauges R511 to R514 on the X-axis constitute a bridge circuit 521 as shown in FIG. 18A to obtain a voltage Vx. The strain gauges R521 to R524 on the Y-axis constitute a bridge circuit 522 as shown in FIG. 18B to obtain a voltage Vy. Further, the strain gauges R531 to R534 on the S-axis constitute a bridge circuit 523 as shown in FIG. 18C to obtain a voltage Vz. By combination of the voltages Vx, Vy, and Vz obtained by the bridge circuits 521 to 523, three-axial forces or moments on the X-, Y-, and Z-axes applied to the force receiving portion 511 can be calculated.

Patent Document 1: JP-A-4-194634 (FIG. 2; FIG. 3; FIG. 7; page 3, lower left column, line 3 to lower right column, line 6; and page 4, lower right column, lines 9 to 15)

DISCLOSURE OF THE INVENTION

Problem that the Invention is to Solve

Now will be examined a case wherein an X-axial positive force is applied to the force receiving portion 511 of the strain gauge type sensor 500, as shown in FIG. 19. In this case, the largest strain epsilon 2 is generated at the inner edge of the diaphragm portion 513 on the X-axis. Contrastingly, the strain epsilon 1 generated at the outer edge of the diaphragm portion 513 on the X-axis is extremely smaller than the strain epsilon 2 generated at the inner edge. Here, the magnitude of the strain is merely considered without distinguishing between the tensile strain and the compressive strain.

Likewise, when a force or moment is applied in either direction on any of the three axes of the X-, Y-, and Z-axes, the strain generated at the outer edge of the diaphragm portion 513 on the corresponding axis is extremely smaller than the strain generated at the inner edge. That is, in the strain gauge type sensor 500, while the strain gauges R512, R513, R522, R523, R532, and R533 change widely in their resistance values, the strain gauges R511, R514, R521, R524, R531, and R534 change little in their resistance values. Thus, of four strain gauges included in each of the bridge circuits 521, 522, and 523, only two strain gauges, that is, R512 and R513 of the bridge circuit 521, R522 and R523 of the bridge circuit 522, and R532 and R533 of the bridge circuit 523, change widely in their resistance values. As a result, any of the bridge circuits 521, 522, and 523 decreases in its output. This brings about a problem of reducing the sensitivity of the sensor.

An object of the present invention is to provide a strain gauge type sensor high in sensitivity, and a strain gauge type sensor unit using the sensor.

Means for Solving the Problem and Effect of the Invention

According to a first aspect of the present invention, a strain gauge type sensor is provided wherein the sensor comprises a strain generation body comprising a force receiving portion to which a force is applied, a fixed portion fixed to a supporting body, and an interconnecting portion that interconnects the force receiving portion and the fixed portion and in which strain is generated according to the force applied to the force receiving portion; a first strain gauge disposed on the interconnecting portion of the strain generation body; and a second strain gauge disposed on the interconnecting portion at a position nearer to the fixed portion than the first strain gauge, and the interconnecting portion has a shape such that the quantity of strain at the position where the first strain gauge is disposed is smaller than the quantity of strain at the position where the second strain gauge is disposed, when stresses equal in magnitude are applied to the position where the first strain gauge is disposed and the position where the second strain gauge is disposed.

According to this aspect, when a force is externally applied to the force receiving portion, the difference in the quantity of strain in the interconnecting portion can be decreased between the position where the first strain gauge is disposed and the position where the second strain gauge is disposed. Therefore, the difference in the quantity of change in resistance value can be decreased between the first and second strain gauges. Consequently, the force externally applied to the strain gauge type sensor can be measured with high sensitivity.

The strain gauge type sensor of the present invention may comprise two first strain gauges and two second strain gauges, and the first and second strain gauges are arranged on a single straight line.

According to this feature, a 1-axial force externally applied to the force receiving portion can be detected by four strain gauges arranged on the single straight line.

The strain gauge type sensor of the present invention may comprise six first strain gauges and six second strain gauges, and each set of two first strain gauges and two second strain gauges are arranged on each of three straight lines different from each other.

According to this feature, 3-axial forces externally applied to the force receiving portion can be detected by four strain gauges arranged on each of three straight lines different from each other.

In the strain gauge type sensor of the present invention, the force receiving portion may be columnar, and each of the fixed portion and the interconnecting portion may be annular and disposed concentrically with the force receiving portion.

According to this feature, a force can be applied in any direction in a plane parallel to the interconnecting portion.

In the strain gauge type sensor of the present invention, the interconnecting portion may comprise a first diaphragm on which the first strain gauge is disposed; a second diaphragm that is thinner than the first diaphragm and on which the second strain gauge is disposed; and a connecting portion that is thicker than the first diaphragm and connects the first and second diaphragms to each other.

According to this feature, when stresses equal in magnitude to each other are applied to the position of the first diaphragm where the first strain gauge is disposed and the position of the second diaphragm where the second strain gauge is disposed, the quantity of strain at the position where the first stain gauge is disposed is smaller than the quantity of strain at the position where the second stain gauge is disposed. Therefore, when a force is externally applied to the force receiving portion, the difference in the quantity of strain in the interconnecting portion can be decreased between the position where the first strain gauge is disposed and the position where the second strain gauge is disposed. Thus, the difference in the quantity of change in resistance value can be decreased between the first and second strain gauges. Consequently, the force externally applied to the strain gauge type sensor can be measured with high sensitivity.

In the strain gauge type sensor of the present invention, at least one of the difference in thickness between the first and second diaphragms and the difference in length between the first and second diaphragms, may be set such that the quantity of change in resistance value of the first strain gauge is substantially equal to the quantity of change in resistance value of the second strain gauge when a force is applied to the force receiving portion.

According to this feature, the force externally applied to the strain gauge type sensor can be measured with the highest sensitivity.

In the strain gauge type sensor of the present invention, the interconnecting portion may gradually decrease in thickness from the position where the first strain gauge is disposed, toward the position where the second strain gauge is disposed.

According to this feature, when stresses equal in magnitude to each other are applied to the position where the first strain gauge is disposed and the position where the second strain gauge is disposed, the quantity of strain at the position where the first stain gauge is disposed is smaller than the quantity of strain at the position where the second stain gauge is disposed. Therefore, when a force is externally applied to the force receiving portion, the difference in the quantity of strain in the interconnecting portion can be decreased between the position where the first strain gauge is disposed and the position where the second strain gauge is disposed. Thus, the difference in the quantity of change in resistance value can be decreased between the first and second strain gauges. Consequently, the force externally applied to the strain gauge type sensor can be measured with high sensitivity.

In the strain gauge type sensor of the present invention, the difference in thickness of the interconnecting portion between the position where the first strain gauge is disposed and the position where the second strain gauge is disposed, may be set such that the quantity of change in resistance value of the first strain gauge is substantially equal to the quantity of change in resistance value of the second strain gauge when a force is applied to the force receiving portion.

According to this feature, the force externally applied to the strain gauge type sensor can be measured with the highest sensitivity.

In the strain gauge type sensor of the present invention, a connecting portion between the force receiving portion and the interconnecting portion may have a predetermined curvature, and a connecting portion between the fixed portion and the interconnecting portion may have a curvature larger than the predetermined curvature.

According to this feature, when stresses equal in magnitude to each other are applied to the position where the first strain gauge is disposed and the position where the second strain gauge is disposed, the quantity of strain at the position where the first stain gauge is disposed is smaller than the quantity of strain at the position where the second stain gauge is disposed. Therefore, when a force is externally applied to the force receiving portion, the difference in the quantity of strain in the interconnecting portion can be decreased between the position where the first strain gauge is disposed and the position where the second strain gauge is disposed. Thus, the difference in the quantity of change in resistance value can be decreased between the first and second strain gauges. Consequently, the force externally applied to the strain gauge type sensor can be measured with high sensitivity.

In the strain gauge type sensor of the present invention, the difference in curvature between the connecting portion between the force receiving portion and the interconnecting portion and the connecting portion between the fixed portion and the interconnecting portion, may be set such that the quantity of change in resistance value of the first strain gauge is substantially equal to the quantity of change in resistance value of the second strain gauge when a force is applied to the force receiving portion.

According to this feature, the force externally applied to the strain gauge type sensor can be measured with the highest sensitivity.

According to a second aspect of the present invention, a strain gauge type sensor is provided wherein the sensor comprises a strain generation body comprising a force receiving portion to which a force is applied, a fixed portion fixed to a supporting body, and an interconnecting portion that interconnects the force receiving portion and the fixed portion and in which strain is generated according to the force applied to the force receiving portion; a first strain gauge disposed on the interconnecting portion of the strain generation body; and a second strain gauge disposed on the interconnecting portion at a position nearer to the fixed portion than the first strain gauge, and the first strain gauge is shorter than the second strain gauge.

According to this aspect, when a force is externally applied to the force receiving portion, the difference in the quantity of change in resistance value can be decreased between the first and second strain gauges. Consequently, the force externally applied to the strain gauge type sensor can be measured with high sensitivity.

In the strain gauge type sensor of the present invention, the difference in length between the first and second strain gauges may be set such that the quantity of change in resistance value of the first strain gauge is substantially equal to the quantity of change in resistance value of the second strain gauge when a force is applied to the force receiving portion.

According to this feature, the force externally applied to the strain gauge type sensor can be measured with the highest sensitivity.

According to a third aspect of the present invention, a strain gauge type sensor is provided wherein the sensor comprises a strain generation body comprising a force receiving portion to which a force is applied, a fixed portion fixed to a supporting body, and an interconnecting portion that interconnects the force receiving portion and the fixed portion and in which strain is generated according to the force applied to the force receiving portion; a first strain gauge disposed on the interconnecting portion of the strain generation body; and a second strain gauge disposed on the interconnecting portion at a position nearer to the fixed portion than the first strain gauge, the interconnecting portion comprises a first diaphragm on which the first strain gauge is disposed; a second diaphragm on which the second strain gauge is disposed; and a connecting portion that connects the first and second diaphragms to each other, and at least one of the difference in thickness between the first and second diaphragms, the difference in length between the first and second diaphragms, and the difference in length between the first and second strain gauges, is set such that the quantity of change in resistance value of the first strain gauge is substantially equal to the quantity of change in resistance value of the second strain gauge when a force is applied to the force receiving portion.

According to this aspect, the force externally applied to the strain gauge type sensor can be measured with the highest sensitivity.

According to a fourth aspect of the present invention, a strain gauge type sensor is provided wherein the sensor comprises a strain generation body comprising a force receiving portion to which a force is applied, a fixed portion fixed to a supporting body, and an interconnecting portion that interconnects the force receiving portion and the fixed portion and in which strain is generated according to the force applied to the force receiving portion; a first strain gauge disposed on the interconnecting portion of the strain generation body; and a second strain gauge disposed on the interconnecting portion at a position nearer to the fixed portion than the first strain gauge, the interconnecting portion gradually decreases in thickness from the position where the first strain gauge is disposed, toward the position where the second strain gauge is disposed, and at least one of the difference in thickness of the interconnecting portion between the position where the first strain gauge is disposed and the position where the second strain gauge is disposed, and the difference in length between the first and second strain gauges, is set such that the quantity of change in resistance value of the first strain gauge is substantially equal to the quantity of change in resistance value of the second strain gauge when a force is applied to the force receiving portion.

According to this aspect, the force externally applied to the strain gauge type sensor can be measured with the highest sensitivity.

According to a fifth aspect of the present invention, a strain gauge type sensor is provided wherein the sensor comprises a strain generation body comprising a force receiving portion to which a force is applied, a fixed portion fixed to a supporting body, and an interconnecting portion that interconnects the force receiving portion and the fixed portion and in which strain is generated according to the force applied to the force receiving portion; a first strain gauge disposed on the interconnecting portion of the strain generation body; and a second strain gauge disposed on the interconnecting portion at a position nearer to the fixed portion than the first strain gauge, a connecting portion between the force receiving portion and the interconnecting portion has a predetermined curvature, and a connecting portion between the fixed portion and the interconnecting portion has a curvature larger than the predetermined curvature, and at least one of the difference in curvature between the connecting portion between the force receiving portion and the interconnecting portion and the connecting portion between the fixed portion and the interconnecting portion, and the difference in length between the first and second strain gauges, is set such that the quantity of change in resistance value of the first strain gauge is substantially equal to the quantity of change in resistance value of the second strain gauge when a force is applied to the force receiving portion.

According to this aspect, the force externally applied to the strain gauge type sensor can be measured with the highest sensitivity.

In the strain gauge type sensor of the present invention, each of the strain gauges is preferably made of a piezoresistive element.

According to this feature, because the piezoresistive element is ten times or more higher in gauge factor than a foil strain gauge, the sensitivity can be increased ten times or more in comparison with a case of using the foil strain gauge.

A strain gauge type sensor unit of the present invention comprises a plurality of strain gauge type sensors as described above, on a single plane.

According to this aspect, forces, moments, accelerations, angular accelerations, and so on, applied to the strain gauge type sensor unit, can be detected with high sensitivity.

In the strain gauge type sensor unit of the present invention, the plurality of strain gauge type sensors are preferably arranged around a center point at regular angular intervals at the same distance from the center point.

According to this feature, forces, moments, accelerations, angular accelerations, and so on, applied to the strain gauge type sensor unit, can be derived by relatively simple calculation from changes in resistance value of the strain gauges of the strain gauge type sensors.

In the strain gauge type sensor unit of the present invention, the regular angular interval may be 90 degrees.

According to this feature, forces, moments, accelerations, angular accelerations, and so on, on orthogonal two axes, can be calculated very easily.

In the strain gauge type sensor unit of the present invention, the regular angular interval may be 120 degrees.

According to this feature, forces, moments, accelerations, angular accelerations, and so on, applied to the strain gauge type sensor unit, can be derived with three strain gauge type sensors. Thus, the strain gauge type sensor unit can be simplified in construction.

Best Form for Carrying Out the Invention

Hereinafter, preferred embodiments of the present invention will be described with reference to drawings.

First, a strain gauge type sensor 1 according to a first embodiment of the present invention will be described with reference to FIGS. 1 and 2.

FIG. 1 is a cross-sectional view of the strain gauge type sensor 1 according to the first embodiment of the present invention. The strain gauge type sensor 1 includes a strain generation body 10 made up of a substantially columnar force receiving portion 11 provided at the center, a fixed portion 12 provided around the force receiving portion 11, and a substantially annular interconnecting portion 13 interconnecting a portion near the upper surface of the force receiving portion 11 and the fixed portion 12; and strain gauges R11 to R34 each made of a piezoresistive element and attached to the strain generation body 10. The upper surface of the force receiving portion 11 and the upper surface of the interconnecting portion 13 are on the same plane.

In this example, an XYZ three-dimensional coordinate system is defined for convenience of explanation, and the arrangement of components will be explained with reference to the coordinate system. In FIG. 1, the origin O is defined at the center of the upper surface of the force receiving portion 11; the X-axis is defined so as to extend horizontally rightward; the Z-axis is defined so as to extend vertically upward; and the Y-axis is defined so as to extend backward perpendicularly to FIG. 1. That is, the upper surface of the force receiving portion 11 and the upper surface of the interconnecting portion 13 are on the XY plane, and the Z-axis extends through the center of the force receiving portion 11. An S-axis is defined as an axis that extends through the origin O and forms an angle of 45 degrees from the X-axial positive portion to the Y-axial positive portion, as shown in FIG. 2. The angle between the S-axis and the X-axis may be arbitrarily changed except when the S-axis coincides with the X- or Y-axis.

The strain generation body 10 is made of a metallic flexible material such as aluminum or SUS. The fixed portion 12 is for attaching the strain gauge type sensor 1 to another device. The fixed portion 12 is formed into a large-thickness portion high in rigidity so that the portion 12 is hard to be strained or deformed even when an external force is applied to the force receiving portion 11. An annular shallow groove 13a having a predetermined width is formed at an inner edge portion on the lower face of the interconnecting portion 13; and an annular deep groove 13b is formed at an outer edge portion on the lower face of the interconnecting portion 13. Consequently, a thick portion 14 having a large thickness is formed near a central portion of the interconnecting portion 13, that is, at the portion corresponding to the portion between 13a and 13b.

In this embodiment, the shallow groove 13a is equal to the deep groove 13b in width, that is, the horizontal length in FIG. 1. The depth D1 of the shallow groove 13a, the depth D2 of the deep groove 13b, and the difference D0 between the depth D1 of the shallow groove 13a and the depth D2 of the deep groove 13b, are correlative as shown in the following expressions (Expression 1) and (Expression 2).

D1 smaller than D2  (Expression 1)

$D2-D1=D0$  (Expression 2)

In the strain gauge type sensor 1, a diaphragm 15 is formed at the portion corresponding to the shallow groove 13a of the interconnecting portion 13; and a diaphragm 16 is formed at the portion corresponding to the deep groove 13b. That is, the vicinity of the inner edge portion of the interconnecting portion 13 functions as the diaphragm 15; and the vicinity of the outer edge portion functions as the diaphragm 16. When an external force or moment is applied to the force receiving portion 11, strains generated in the interconnecting portion 13 concentrate at the diaphragms 15 and 16.

The diaphragm 15 is thicker than the diaphragm 16. The difference T0 in thickness between the diaphragms 15 and 16 is equal to the difference D0 between the depth D1 of the shallow groove 13a and the depth D2 of the deep groove 13b. The difference D0 between the depth D1 of the shallow groove 13a and the depth D2 of the deep groove 13b, that is, the difference T0 in thickness between the diaphragms 15 and 16, is determined such that the quantities of changes in strain generated at the intersections of straight lines extending through the origin O with the diaphragms 15 and 16 are substantially equal to each other before and after an external force or moment is applied to the force receiving portion 11.

As each of the strain gauges R11 to R34, a metallic foil strain gauge or a metallic wire strain gauge is used. Each of the strain gauges R11 to R34 is a kind of a resistor, and a strain gauge to be used by being attached to where a strain is generated. In such a strain gauge, when an object to be measured is strained and elongated/contracted, the strain gauge is elongated/contracted in proportion to the elongation/contraction of the object. Accordingly, the strain gauge changes in its resistance value, and thereby the strain epsilon can be measured. In general, such a gauge has a proportional characteristic in which the resistance value increases to a strain epsilon by tension and the resistance value decreases to a strain epsilon by compression. In addition, the larger the length of the gauge, the larger the quantity of change in the resistance value. Normally, such a gauge is used within the elastic region of the material in which the stress sigma is in proportion to the strain epsilon.

Next, the arrangement of the strain gauges R11 to R34 will be described with reference to FIG. 2. FIG. 2 is an upper view of the strain gauge type sensor 1. The representation of leads of the strain gauges R11 to R34 is omitted.

As shown in FIG. 2, strain gauges R11 to R14 are disposed on and along the X-axis to detect an X-axial component force externally applied. The strain gauge R11 is disposed at a portion corresponding to an X-axial positive portion of the diaphragm 16; the strain gauge R12 is disposed at a portion corresponding to an X-axial positive portion of the diaphragm 15; the strain gauge R13 is disposed at a portion corresponding to an X-axial negative portion of the diaphragm 15; and the strain gauge R14 is disposed at a portion corresponding to an X-axial negative portion of the diaphragm 16.

Strain gauges R21 to R24 are disposed on and along the Y-axis to detect a Y-axial component force externally applied. The strain gauge R21 is disposed at a portion corresponding to a Y-axial negative portion of the diaphragm 16; the strain gauge R22 is disposed at a portion corresponding to a Y-axial negative portion of the diaphragm 15; the strain gauge R23 is disposed at a portion corresponding to a Y-axial positive portion of the diaphragm 15; and the strain gauge R24 is disposed at a portion corresponding to a Y-axial positive portion of the diaphragm 16.

Strain gauges R31 to R34 are disposed on and along the S-axis to detect a Z-axial component force externally applied. The strain gauge R31 is disposed at a portion corresponding to an S-axial positive portion of the diaphragm 16; the strain gauge R32 is disposed at a portion corresponding to an S-axial positive portion of the diaphragm 15; the strain gauge R33 is disposed at a portion corresponding to an S-axial negative portion of the diaphragm 15; and the strain gauge R34 is disposed at a portion corresponding to an S-axial negative portion of the diaphragm 16.

As described above, any of the strain gauges R11 to R34 is disposed on the interconnecting portion 13. The strain gauge R11 is disposed at an X-axial positive outer edge portion of the interconnecting portion 13; the strain gauge R12 is disposed at an X-axial positive inner edge portion; the strain gauge R13 is disposed at an X-axial negative inner edge portion; and the strain gauge R14 is disposed at an X-axial negative outer edge portion. The strain gauge R21 is disposed at a Y-axial negative outer edge portion of the interconnecting portion 13; the strain gauge R22 is disposed at a Y-axial negative inner edge portion; the strain gauge R33 is disposed at a Y-axial positive inner edge portion; and the strain gauge R24 is disposed at a Y-axial positive outer edge portion. Further, the strain gauge R31 is disposed at an S-axial positive outer edge portion of the interconnecting portion 13; the strain gauge R32 is disposed at an S-axial positive inner edge portion; the strain gauge R33 is disposed at an S-axial negative inner edge portion; and the strain gauge R34 is disposed at an S-axial negative outer edge portion.

The strain gauges R11 to R34 are the same in length. More specifically, the length of each of the stain gauges R11 to R14 along the X-axis, the length of each of the stain gauges R21 to R24 along the Y-axis, and length of each of the stain gauges R31 to R34 along the S-axis, are the same as each other. The length of each of the strain gauges R11 to R34 is equal to the length of each of the diaphragms 15 and 16. More specifically, the length of each of the strain gauges R11 to R34 is equal to the length of each of the diaphragms 15 and 16 on the X-, Y-, or S-axis.

The strain gauges R11 to R34 are disposed such that the center of the length of each gauge along the X-, Y-, or S-axis coincides with the center of the width of the diaphragm 15 or the center of the width of the diaphragm 16.

In this embodiment, as described above, the difference T0 in thickness between the diaphragms 15 and 16 is determined such that the quantities of changes in strain generated at the intersections of straight lines extending through the origin O with the diaphragms 15 and 16 are substantially equal to each other. Therefore, the quantities of changes in strain at the positions on the X-axis where the strain gauges R11, R12, R13, and R14 are disposed, are substantially equal to each other. Consequently, the quantities of changes in resistance value of the strain gauges R11, R12, R13, and R14 are substantially equal to each other.

Likewise, the quantities of changes in strain at the positions on the Y-axis where the strain gauges R21, R22, R23, and R24 are disposed, are also substantially equal to each other. Consequently, the quantities of changes in resistance value of the strain gauges R21, R22, R23, and R24 are substantially equal to each other. Further, the quantities of changes in strain at the positions on the S-axis where the strain gauges R31, R32, R33, and R34 are disposed, are also substantially equal to each other. Consequently, the quantities of changes in resistance value of the strain gauges R31, R32, R33, and R34 are substantially equal to each other.

Next, the principle for detecting forces on the respective axes will be described.

FIG. 3 shows a state of the strain gauge type sensor 1 and changes in resistance value of the strain gauges R11 to R14 when an X-axial positive force Fx is applied to the force receiving portion 11. The force Fx acts as a moment My, around the Y-axis, corresponding to the distance L between the application point 11a of the force receiving portion 11 and the origin O of the strain gauge type sensor 1. At this time, as shown in FIG. 3, strains by compression are generated at a portion corresponding to the X-axial positive portion of the diaphragm 16 and a portion corresponding to the X-axial negative portion of the diaphragm 15; and strains by tension are generated at a portion corresponding to the X-axial positive portion of the diaphragm 15 and a portion corresponding to the X-axial negative portion of the diaphragm 16. The strains are detected by the strain gauges R11 to R14. In FIG. 3, (+) represents an increase in resistance value of the strain gauge; and (−) represents a decrease in resistance value of the strain gauge.

Next, when a Y-axial positive force Fy is applied to the force receiving portion 11, the force Fy acts as a moment Mx, around the X-axis, corresponding to the distance L between the application point 11a of the force receiving portion 11 and the origin O of the strain gauge type sensor 1. This can be thought by shifting by 90 degrees the above-described state when the X-axial force Fx is applied, and thus the description thereof is omitted here.

FIG. 4 shows a state of the strain gauge type sensor 1 when a Z-axial positive force Fz is applied to the force receiving portion 11. At this time, as shown in FIG. 4, strains by compression are generated at portions corresponding to the diaphragm 16; and strains by tension are generated at portions corresponding to the diaphragm 15. The strains are detected by the strain gauges R31 to R34.

Table 1 shows changes in resistance value of the strain gauges R11 to R34 for the respective forces as described above. In the table, + represents an increase in resistance value; − represents a decrease in resistance value; and no sign represents substantially no change in resistance value. The force or moment in the reverse direction is inverted in sign.

TABLE 1

| | Strain gauge | | | | | | | | | | | |
|---|---|---|---|---|---|---|---|---|---|---|---|---|
| | X-axis | | | | Y-axis | | | | S-axis | | | |
| Force | R11 | R12 | R13 | R14 | R21 | R22 | R23 | R24 | R31 | R32 | R33 | R34 |
| Fx(My) | − | + | − | + | | | | | − | + | − | + |
| Fy(Mx) | | | | | + | − | + | − | − | + | − | + |
| Fz | − | + | + | − | − | + | + | − | − | + | + | − | constituted by the strain gauges R11 to R34. More specifically, FIG. 5A shows a bridge circuit 17 constituted by the strain gauges R11 to R14 on the X-axis; FIG. 5B shows a bridge circuit 18 constituted by the strain gauges R21 to R24 on the Y-axis; and FIG. 5C shows a bridge circuit 19 constituted by the strain gauges R31 to R34 on the S-axis.

As shown in FIG. 5A, in the bridge circuit 17, R11 and R14 are connected in series and R12 and R13 are connected in series from a driving voltage V+ to GND. The voltage of a node a between R11 and R14 is represented by Va; and the voltage of a node b between R12 and R13 is represented by Vb.

As shown in FIG. 5B, in the bridge circuit 18, R21 and R24 are connected in series and R22 and R23 are connected in series from the driving voltage V+ to GND. The voltage of a node c between R21 and R24 is represented by Vc; and the voltage of a node d between R22 and R23 is represented by Vd.

As shown in FIG. 5C, in the bridge circuit 19, R31 and R34 are connected in series and R32 and R33 are connected in series from the driving voltage V+ to GND. The voltage of a node e between R31 and R34 is represented by Vd; and the voltage of a node f between R32 and R33 is represented by Vf.

FIG. 6 shows relations between the node voltages Va to Vf and the forces or moments applied to the force receiving portion 11. The force Fx and the moment My can be measured as the difference Vx (=Va−Vb) between the node voltages Va and Vb. The force Fy and the moment Mx can be measured as the difference Vy (=Vc−Vd) between the node voltages Vc and Vd. Further, the force Fz can be measured as the difference Vz (=Ve−Vf) between the node voltages Ve and Vf. These calculations may be directly electrically performed by using an OA amplifier, or may be performed with a computer after the node voltages are A/D-converted.

As described above, in the strain gauge type sensor 1 of this embodiment, the difference in thickness between the diaphragms 15 and 16 is determined such that the magnitudes of strains at the intersections of straight lines extending through the origin O with the diaphragms 15 and 16 are substantially equal to each other. In addition, each of the strain gauges R11 to R34 is disposed at a position on the X-, Y-, or S-axis corresponding to the diaphragm 15 or 16. Therefore, when an external force or moment is applied to the force receiving portion 11, the quantities of changes in the magnitude of strain at the positions on the X-, Y-, or S-axis where the strain gauges are disposed, are substantially equal to each other. Thus, the quantities of changes in resistance value of the strain gauges are also substantially equal to each other. Consequently, the force or moment externally applied to the force receiving portion 11 of the strain gauge type sensor 1 can be measured with high sensitivity.

The strain gauges R11 to R34 are disposed on the orthogonal X- and Y-axes extending through the origin O and the S-axis that extends through the origin O and forms an angle of 45 degrees from the X-axial positive portion to the Y-axial positive portion. Therefore, the strain gauge type sensor 1 can detect X-axial and Y-axial forces and moments, and further, a force on the Z-axis that extends through the origin O perpendicularly to the X- and Y-axes.

Next, a construction of a strain gauge type sensor 2 according to a second embodiment of the present invention will be described with reference to FIG. 7.

FIG. 7 is a cross-sectional view of the strain gauge type sensor according to the second embodiment of the present invention, which corresponds to the first embodiment shown in FIG. 1. The strain gauge type sensor 2 according to this embodiment differs from the strain gauge type sensor 1 according to the first embodiment shown in FIG. 1 mainly in a point that an interconnecting portion 23 of this embodiment is formed into a single diaphragm while the interconnecting portion 13 of the first embodiment is made up of the thick portion 14 and diaphragms 15 and 16. The other construction, the principle for detecting forces and moments, and the circuit constructions, are substantially the same as those of the strain gauge type sensor 1 according to the first embodiment, and therefore, the detailed description thereof will be omitted.

As shown in FIG. 7, the interconnecting portion 23 is formed into a small-thickness portion to function as a diaphragm. The interconnecting portion 23 is substantially annular. The lower surface of the interconnecting portion 23 slopes at a constant gradient so that the thickness of the interconnecting portion 23 gradually decreases toward the outer portion. Therefore, the portion near the outer edge of the interconnecting portion 23 is thinner than the portion near the inner edge.

The difference D0' in thickness between the inner and outer edge portions of the interconnecting portion 23, which depends upon the degree of the gradient of the lower surface of the interconnecting portion 23, is determined such that the quantities of changes in the strains generated at positions on a straight line extending through the origin O, corresponding to the vicinities of the respective inner and outer edges of the interconnecting portion 23, are substantially equal to each other before and after an external force or moment is applied to the force receiving portion 11.

The arrangement of the strain gauges R11 to R34 of this embodiment is substantially the same as that of the first embodiment. The strain gauges R11 to R34 are disposed on the interconnecting portion 23 corresponding to the interconnecting portion 13 of the first embodiment. More specifically, each of the strain gauges R11 to R14 is disposed on the X-axis at the outer or inner edge portion of the interconnecting portion 23. Each of the strain gauges R21 to R24 is disposed on the Y-axis at the outer or inner edge portion of the interconnecting portion 23. Each of the strain gauges R31 to R34 is disposed on the S-axis at the outer or inner edge portion of the interconnecting portion 23.

As described above, the difference D0' in thickness between the inner and outer edge portions of the interconnecting portion 23 is determined such that the quantities of changes in the strains generated at positions on a straight line extending through the origin O, corresponding to the vicinities of the respective inner and outer edges of the interconnecting portion 23, are substantially equal to each other. Therefore, the quantities of changes in strain at the positions on the X-axis where the strain gauges R11 to R14 are disposed, are substantially equal to each other. Consequently, the quantities of changes in resistance value of the strain gauges R11 to R14 are substantially equal to each other.

Likewise, the quantities of changes in strain at the positions on the Y-axis where the strain gauges R21 to R24 are disposed, are also substantially equal to each other. Consequently, the quantities of changes in resistance value of the strain gauges R21 to R24 are substantially equal to each other. Further, the quantities of changes in strain at the positions on the S-axis where the strain gauges R31 to R34 are disposed, are also substantially equal to each other. Consequently, the quantities of changes in resistance value of the strain gauges R31 to R34 are substantially equal to each other.

As described above, the strain gauge type sensor 2 of this embodiment can bring about the same effect as the strain gauge type sensor 1 of the first embodiment.

Next, a construction of a strain gauge type sensor 3 according to a third embodiment of the present invention will be described with reference to FIG. 8.

FIG. 8 is a cross-sectional view of the strain gauge type sensor according to the third embodiment of the present invention, which corresponds to the first embodiment shown in FIG. 1. The strain gauge type sensor 3 according to this embodiment differs from the strain gauge type sensor 1 according to the first embodiment shown in FIG. 1 mainly in a point that an interconnecting portion 33 of this embodiment is formed into a single diaphragm while the interconnecting portion 13 of the first embodiment is made up of the thick portion 14 and diaphragms 15 and 16. The other construction, the principle for detecting forces and moments, and the circuit constructions, are substantially the same as those of the strain gauge type sensor 1 according to the first embodiment, and therefore, the detailed description thereof will be omitted.

As shown in FIG. 8, the interconnecting portion 33 is formed into a small-thickness portion to function as a diaphragm. The interconnecting portion 33 is substantially annular. A plate-like portion 33a having a constant thickness is formed near the outer edge of the interconnecting portion 33; and a curved portion 33b having a constant curvature and gradually increasing in thickness toward the inner edge of the interconnecting portion 33 is formed near the inner edge of the interconnecting portion 33.

The curvature of the curved portion 33b is determined such that the quantities of changes in the strains generated at positions on a straight line extending through the origin O, corresponding to the vicinities of the respective inner and outer edges of the interconnecting portion 33, are substantially equal to each other before and after an external force or moment is applied to the force receiving portion 11.

The arrangement of the strain gauges R11 to R34 of this embodiment is substantially the same as that of the first embodiment. The strain gauges R11 to R34 are disposed on the interconnecting portion 33 corresponding to the interconnecting portion 13 of the first embodiment. More specifically, each of the strain gauges R11 to R14 is disposed on the X-axis at the outer or inner edge portion of the interconnecting portion 33. Each of the strain gauges R21 to R24 is disposed on the Y-axis at the outer or inner edge portion of the interconnecting portion 33. Each of the strain gauges R31 to R34 is disposed on the S-axis at the outer or inner edge portion of the interconnecting portion 33.

As described above, the curvature of the curved portion 33b is determined such that the quantities of changes in the strains generated at positions on a straight line extending through the origin O, corresponding to the vicinities of the respective inner and outer edges of the interconnecting portion 33, are substantially equal to each other. Therefore, the quantities of changes in strain at the positions on the X-axis where the strain gauges R11 to R14 are disposed, are substantially equal to each other. Consequently, the quantities of changes in resistance value of the strain gauges R11 to R14 are substantially equal to each other.

Likewise, the quantities of changes in strain at the positions on the Y-axis where the strain gauges R21 to R24 are disposed, are also substantially equal to each other. Consequently, the quantities of changes in resistance value of the strain gauges R21 to R24 are substantially equal to each other. Further, the quantities of changes in strain at the positions on the S-axis where the strain gauges R31 to R34 are disposed, are also substantially equal to each other. Consequently, the quantities of changes in resistance value of the strain gauges R31 to R34 are substantially equal to each other.

As described above, the strain gauge type sensor 3 of this embodiment can bring about the same effect as the strain gauge type sensor 1 of the first embodiment and the strain gauge type sensor 2 of the second embodiment.

Next, a construction of a strain gauge type sensor 4 according to a fourth embodiment of the present invention will be described with reference to FIG. 9.

FIG. 9 is a cross-sectional view of the strain gauge type sensor according to the fourth embodiment of the present invention, which corresponds to the first embodiment shown in FIG. 1. The strain gauge type sensor 4 according to this embodiment differs from the strain gauge type sensor 1 according to the first embodiment shown in FIG. 1 mainly in a point that diaphragms 45 and 46 of this embodiment are equal in thickness to each other and the length of each of the strain gauges R11, R14, R21, R24, R31, and R34, disposed at a position corresponding to the diaphragm 46, along the X-, Y-, or S-axis, is more than the length of each of the strain gauges R12, R13, R22, R23, R32, and R33, disposed at a position corresponding to the diaphragm 45, along the X-, Y-, or S-axis, while the diaphragm 16 is thinner than the diaphragm 15 in the first embodiment and the strain gauges R11 to R34 of the first embodiment have the same length along the X-, Y-, or S-axis. The other construction, the principle for detecting forces and moments, and the circuit constructions, are substantially the same as those of the strain gauge type sensor 1 according to the first embodiment, and therefore, the detailed description thereof will be omitted.

As shown in FIG. 9, the diaphragms 45 and 46 are formed near the respective inner and outer edges of a substantially annular interconnecting portion 43 such that the diaphragms 45 and 46 are equal to each other in width and thickness. Therefore, as for the quantities of changes in the strains generated at the intersections of a straight line extending through the origin O with the respective diaphragms 45 and 46 before and after an external force or moment is applied to the force receiving portion 41, the quantity of the change in the strain generated at the diaphragm 46 is less than the quantity of the change in the strain generated at the diaphragm 45.

The arrangement of the strain gauges R11 to R34 of this embodiment is substantially the same as that of the first embodiment. The strain gauges R11 to R34 are disposed on the interconnecting portion 43 corresponding to the interconnecting portion 13 of the first embodiment. More specifically, each of the strain gauges R11 to R14 is disposed on the X-axis at a position corresponding to a diaphragm 45 or 46. Each of the strain gauges R21 to R24 is disposed on the Y-axis at a position corresponding to a diaphragm 45 or 46. Each of the strain gauges R31 to R34 is disposed on the S-axis at a position corresponding to a diaphragm 45 or 46.

In this embodiment, the length L1 of each of the strain gauges R12, R13, R22, R23, R32, and R33, disposed at a position corresponding to the diaphragm 45, along the X-, Y-, or S-axis, the length L2 of each of the strain gauges R11, R14, R21, R24, R31, and R34, disposed at a position corresponding to the diaphragm 46, along the X-, Y-, or S-axis, and the difference L0 between L1 and L2, are correlative as shown in the following expressions (Expression 3) and (Expression 4).

L1 smaller than L2    (Expression 3)

$L2-L1=L0$    (Expression 4)

The difference L0 between L1 and L2 is determined such that the quantities of changes in resistance value of ones of the strain gauges R11 to R34, disposed in a row on a straight line extending through the origin O, are substantially equal to each other before and after an external force or moment is applied to the force receiving portion 41.

Therefore, the quantities of changes in resistance value of the strain gauges R11 to R14 disposed on the X-axis are equal to each other; the quantities of changes in resistance value of the strain gauges R21 to R24 disposed on the Y-axis are equal to each other; and the quantities of changes in resistance value of the strain gauges R31 to R34 disposed on the S-axis are equal to each other.

As described above, the strain gauge type sensor 4 of this embodiment can bring about the same effect as the strain gauge type sensor 1 of the first embodiment, the strain gauge type sensor 2 of the second embodiment, and the strain gauge type sensor 3 of the third embodiment.

Next, a construction of a strain gauge type sensor 5 according to a fifth embodiment of the present invention will be described with reference to FIG. 10.

FIG. 10 is a cross-sectional view of the strain gauge type sensor according to the fifth embodiment of the present invention, which corresponds to the first embodiment shown in FIG. 1. The strain gauge type sensor 5 according to this embodiment differs from the strain gauge type sensor 1 according to the first embodiment shown in FIG. 1 mainly in a point that diaphragms 55 and 56 of this embodiment are equal to each other in thickness and the diaphragm 56 is larger in width than the diaphragm 55 while the diaphragm 16 is thinner than the diaphragm 15 in the first embodiment and the diaphragms 15 and 16 are equal to each other in width. The other construction, the principle for detecting forces and moments, and the circuit constructions, are substantially the same as those of the strain gauge type sensor 1 according to the first embodiment, and therefore, the detailed description thereof will be omitted.

As shown in FIG. 10, the diaphragms 55 and 56 are formed near the respective inner and outer edges of a substantially annular interconnecting portion 53 such that the diaphragms 55 and 56 are equal to each other in width. The width W1 of the diaphragm 55, the width W2 of the diaphragm 56, and the difference between them, are correlative as shown in the following expressions (Expression 5) and (Expression 6).

W1 smaller than W2     (Expression 5)

$W2-W1=W0$     (Expression 6)

The difference W0 in width between the diaphragms 55 and 56 is determined such that the quantities of changes in the strains generated at the intersections of a straight line extending through the origin O with the respective diaphragms 55 and 56, are equal to each other before and after an external force or moment is applied to the force receiving portion 51.

The arrangement of the strain gauges R11 to R34 of this embodiment is substantially the same as that of the first embodiment. The strain gauges R11 to R34 are disposed on the interconnecting portion 53 corresponding to the interconnecting portion 13 of the first embodiment. More specifically, each of the strain gauges R11 to R14 is disposed on the X-axis at an outer or inner edge position. Each of the strain gauges R21 to R24 is disposed on the Y-axis at an outer or inner edge position. Each of the strain gauges R31 to R34 is disposed on the S-axis at an outer or inner edge position.

In this embodiment, as described above, the difference W0 in width between the diaphragms 55 and 56 is determined such that the quantities of changes in the strains generated at the intersections of a straight line extending through the origin O with the respective diaphragms 55 and 56, are equal to each other. Therefore, the quantities of changes in strain at the positions on the X-axis where the strain gauges R11 to R14 are disposed, are substantially equal to each other. Consequently, the quantities of changes in resistance value of the strain gauges R11 to R14 are substantially equal to each other.

Likewise, the quantities of changes in strain at the positions on the Y-axis where the strain gauges R21 to R24 are disposed, are also substantially equal to each other. Consequently, the quantities of changes in resistance value of the strain gauges R21 to R24 are substantially equal to each other. Further, the quantities of changes in strain at the positions on the S-axis where the strain gauges R31 to R34 are disposed, are also substantially equal to each other. Consequently, the quantities of changes in resistance value of the strain gauges R31 to R34 are substantially equal to each other.

As described above, the strain gauge type sensor 5 of this embodiment can bring about the same effect as the strain gauge type sensor 1 of the first embodiment, the strain gauge type sensor 2 of the second embodiment, the strain gauge type sensor 3 of the third embodiment, and the strain gauge type sensor 4 of the fourth embodiment.

Next, a construction of a strain gauge type sensor unit 100 according to a sixth embodiment of the present invention will be described with reference to FIGS. 11 to 13.

FIG. 11 is a view showing the arrangement of strain gauges R111 to R148 provided on a surface 101a of a first member 101 of the strain gauge type sensor unit 100 according to the sixth embodiment of the present invention. FIG. 12 is a cross-sectional view of the strain gauge type sensor unit 100. The strain gauge type sensor unit 100 of this embodiment differs from the strain gauge type sensor 1 of the first embodiment in a point that the strain gauge type sensor unit 100 of this embodiment is a 6-axis force sensor while the strain gauge type sensor 1 of the first embodiment is a 3-axis force sensor.

As shown in FIGS. 11 and 12, the strain gauge type sensor unit 100 includes a first member 101 and a second member 102 opposed to the first member 101. The strain gauge type sensor unit 100 is for measuring at least one of multiaxial force, moment, acceleration, and angular acceleration, externally applied to the first or second member 101 or 102. Each of the first and second members 101 and 102 is formed into a substantially disk-shaped flange. Four strain gauge type sensors 104 to 107 are formed in the first member 101. Four strain generation bodies 10 are formed in the second member 102 so as to be opposed to the respective strain gauge type sensors 104 to 107. The force receiving portions 11 of each of the strain gauge type sensors 104 to 107 and the corresponding strain generation body 10 opposed to the sensor are connected to each other with a bolt 109. Thereby, the first and second members 101 and 102 are united.

The strain gauge type sensor 104 formed in the first member 101 differs in construction from the strain gauge type sensor 1 of the first embodiment in a point that four strain gauges are disposed on each of two axes of the X- and Y-axes, that is, eight strain gauges R111 to R118 are disposed on the strain gauge type sensor 104 of this embodiment while four strain gauges are disposed on each of three axes of the X-, Y-, and S-axes, that is, twelve strain gauges R11 to R34 are disposed on the strain gauge type sensor 1 of the first embodiment. The other construction of the strain gauge type sensor 104 is the same as that of the strain gauge type sensor 1 of the first embodiment, and therefore, the detailed description thereof will be omitted. Likewise, eight strain gauges R121 to R128; R131 to R138; R141 to R148 are disposed on each of the strain gauge type sensors 105, 106, and 107. Thus, four sets of strain gauges R111 to R118, R121 to R128, R131 to R138, and R141 to R148, are disposed on the first member 101.

In this example, an X'Y'Z' three-dimensional coordinate system is defined for convenience of explanation, and the arrangement of components will be explained with reference to the coordinate system. In FIG. 12, the origin O' is defined at the center of the surface 101a of the first member 101; the X'-axis is defined so as to extend horizontally rightward; the Y'-axis is defined so as to extend frontward perpendicularly to FIG. 12; and the Z'-axis is defined so as to extend vertically downward. That is, the surface 101a of the first member 101 is on the X'Y' plane, and the Z'-axis extends through the center of the first member 101.

FIG. 11 shows the X- and Y-axes defined on each upper surface of the strain gauge type sensors 104 to 107.

The strain gauge type sensors 104 to 107 are arranged around the origin O' at regular angular intervals at the same distance from the origin O'. In this embodiment, they are arranged at regular angular intervals of 90 degrees. The strain gauge type sensor 104 is disposed at an X'-axial positive portion; the strain gauge type sensor 105 is disposed at a Y'-axial negative portion; the strain gauge type sensor 106 is disposed at an X'-axial negative portion; and the strain gauge type sensor 107 is disposed at a Y'-axial positive portion. The strain gauge type sensors 104 and 106 are disposed such that their X-axes coincide with the X'-axis; and the strain gauge type sensors 105 and 107 are disposed such that their Y-axes coincide with the Y'-axis.

Thus, the strain gauge type sensor unit 100 functions as a 6-axis force sensor for measuring forces on orthogonal three axes in the three-dimensional space and moments around the respective axes. FIG. 13 shows the directions of the X'-, Y'-, and Z'-axes and the directions of moments Mx', My', and Mz' around the respective axes.

The strain gauge type sensors 104 to 107 are equal to each other in size and shape. Therefore, when the first and second members 101 and 102 and their force receiving portions 11 are displaced such that they form four sides of a parallelogram as a whole, strains corresponding to the directions and magnitudes of forces are generated at positions where the strain gauges R111 to R148 are disposed. Thus, forces and moments can be accurately detected. In a modification, a step may be formed at the attachment position of each strain gauge in order to simplify the attachment work for the strain gauge and intend to protect the strain gauge.

FIG. 14 shows eight bridge circuits constituted by the strain gauges R111 to R148. As shown in FIG. 14, any bridge circuit is constituted by four strain gauges arranged linearly on the X- and Y-axes of the corresponding one of the strain gauge type sensor 104 to 107. Thereby, strain generation conditions in the strain gauge type sensors 104 to 107 can be directly output as eight voltages.

In this case, forces and moments can be calculated by the following (Expression 7) to (Expression 12).

$$Fx'=V4-V2 \quad \text{(Expression 7)}$$

$$Fy'=V3-V1 \quad \text{(Expression 8)}$$

$$Fz'=V5+V6+V7+V8 \quad \text{(Expression 9)}$$

$$Mx'=V8-V5 \quad \text{(Expression 10)}$$

$$My'=V7-V5 \quad \text{(Expression 11)}$$

$$Mz'=V1+V2+V3+V4 \quad \text{(Expression 12)}$$

The above calculations may be carried out by an OP amplifier after resistance values are converted into voltages by known or new means; or carried out with a micro controller or computer by using A/D converters.

As described above, the strain gauge type sensor unit 100 of this embodiment includes four strain gauge type sensors 104 to 107. Therefore, 3-axial forces and moments, or accelerations and angular accelerations, can be measured with high sensitivity.

The strain gauge type sensors 104 to 107 are arranged around the origin O' at regular angular intervals at the same distance from the origin O'. Therefore, forces and moments on the X'-, Y'-, and Z'-axes can be calculated by relatively simple calculation from changes in resistance value of the strain gauges of the strain gauge type sensors 104 to 107.

The strain gauge type sensor 104 is disposed at an X'-axial positive portion; the strain gauge type sensor 105 is disposed at a Y'-axial negative portion; the strain gauge type sensor 106 is disposed at an X'-axial negative portion; and the strain gauge type sensor 107 is disposed at a Y'-axial positive portion. Therefore, forces and moments on the X'- and Y'-axes can be easily calculated.

The strain gauge type sensors 104 and 106 are disposed such that their X-axes coincide with the X'-axis; and the strain gauge type sensors 105 and 107 are disposed such that their Y-axes coincide with the Y'-axis. Therefore, strain gauges are disposed at positions in the strain gauge type sensors 104 to 107 where the largest strains are generated when an external force or moment is applied to the strain gauge type sensor unit 100. Thus, the strains can be detected with high sensitivity.

Therefore, the external force or moment applied to the strain gauge type sensor unit 100 can be measured with high sensitivity.

The strain gauge type sensor unit 100 of this embodiment includes the first member 101 including the strain gauge type sensors 104 to 107 having the strain gauges R11 to R148; and the second member 102 including four strain generation bodies 10 having no strain gauges and opposed to the respective strain gauge type sensors 104 to 107. The force receiving portions 11 of each of the strain gauge type sensors 104 to 107 and the strain generation body 10 opposed to the sensor are connected to each other. Therefore, multiaxial forces and moments can be measured merely by providing strain gauges only on one member.

Next, a construction of a strain gauge type sensor unit 200 according to a seventh embodiment of the present invention will be described with reference to FIG. 15.

FIG. 15 is a view showing the arrangement of strain gauges R211 to R238 provided on a surface 201a of a first member 201 of the strain gauge type sensor unit 200 according to the seventh embodiment of the present invention. The strain gauge type sensor unit 200 of this embodiment differs from the strain gauge type sensor 1 of the first embodiment in a point that the strain gauge type sensor unit 200 of this embodiment is a 6-axis force sensor while the strain gauge type sensor 1 of the first embodiment is a 3-axis force sensor.

As shown in FIG. 15, the strain gauge type sensor unit 200 includes a first member 201 and a not-shown second member opposed to the first member 201. The strain gauge type sensor unit 200 is for measuring at least one of multiaxial force, moment, acceleration, and angular acceleration, externally applied to the first member 201 or the second member. Each of the first member 201 and the second member is formed into a substantially disk-shaped flange. Three strain gauge type sensors 204 to 206 are formed in the first member 201. Three strain generation bodies are formed in the second member so as to be opposed to the respective strain gauge type sensors 204 to 206. The force receiving portions of each of the strain gauge type sensors 204 to 206 and the corresponding strain generation body opposed to the sensor are connected to each other with a not-shown bolt. Thereby, the first member 101 and the second member are united.

The strain gauge type sensor 204 formed in the first member 201 differs in construction from the strain gauge type sensor 1 of the first embodiment in a point that four strain gauges are disposed on each of two axes of the X- and Y-axes, that is, eight strain gauges R211 to R218 are disposed on the strain gauge type sensor 204 of this embodiment while four strain gauges are disposed on each of three axes of the X-, Y-, and S-axes, that is, twelve strain gauges R11 to R34 are disposed on the strain gauge type sensor 1 of the first embodiment. The other construction of the strain gauge type sensor 204 is the same as that of the strain gauge type sensor 1 of the first embodiment, and therefore, the detailed description thereof will be omitted. Likewise, eight strain gauges R221 to R228; R231 to R238 are disposed on each of the strain gauge type sensors 205 and 206. Thus, three sets of strain gauges R211 to R218, R221 to R228, and R231 to R238, are disposed on the first member 201.

In this example, like the above-described sixth embodiment, an X'Y'Z' three-dimensional coordinate system is defined and the arrangement of components will be explained with reference to the coordinate system. FIG. 15 shows the X- and Y-axes defined on each upper surface of the strain gauge type sensors 204 to 206.

The strain gauge type sensors 204 to 206 are arranged around the origin O' at regular angular intervals at the same distance from the origin O'. In this embodiment, they are arranged at regular angular intervals of 120 degrees. The strain gauge type sensor 204 is disposed such that the X-axis of the strain gauge type sensor 204 extends on a segment CO' that extends from the origin O' at an angle of 120 degrees from a negative portion of the Y'-axis to a positive portion of the X'-axis. The strain gauge type sensor 205 is disposed such that its Y-axis coincides with the Y'-axis in the Y'-axial negative direction. The strain gauge type sensor 206 is disposed such that the X-axis of the strain gauge type sensor 206 extends on a segment D0' that extends from the origin O' at an angle of 120 degrees from a negative portion of the Y'-axis to a negative portion of the X'-axis.

The principle for detecting each axial component of a force or moment according to this embodiment will be described. In the below description, it is supposed that the first member 201 is fixed and a force or moment is applied to the second member. In each strain gauge group constituted by four strain gauges linearly arranged, the rate of change in resistance value to a strain is the highest when the strain by tension or compression is applied along the row of the arrangement of the strain gauges. In this case, the sensitivity becomes the highest. Although this embodiment includes six strain gauge groups as shown in FIG. 15, they are different from each other in the direction in which the sensitivity becomes the highest. However, by resolving the sensitivity of each strain gauge group into vectors on three axes of the X'-, Y'-, and Z'-axes, 6-axial components of a force or moment can be detected. Thus, the strain gauge type sensor unit 200 functions as a 6-axis force sensor for measuring forces on orthogonal three axes in the three-dimensional space and moments around the respective axes.

The bridge circuits constituted by the strain gauges R211 to R238 of this embodiment are substantially the same as the bridge circuits of the sixth embodiment. Although eight sensor circuits are constituted in the sixth embodiment by the strain gauge groups linearly arranged on the X- and Y-axes of the strain gauge type sensors 104 to 107, six sensor circuits are constituted in this embodiment by the strain gauge groups linearly arranged on the X- and Y-axes of the strain gauge type sensors 204 to 206. Thereby, strain generation conditions in the strain gauge type sensors 204 to 206 can be directly output as six voltages.

By calculation using the output voltage value from each sensor circuit in consideration of the angle of each strain gauge group with the X'- or Y'-axis and the distance between the origin O' and the origin O of each of the strain gauge type sensors 204 to 206, forces Fx', Fy', and Fz' on the X'-, Y'-, and Z'-axes and moments Mx', My', and Mz' around the respective axes can be calculated.

As described above, the strain gauge type sensor unit 200 of this embodiment can bring about the same effect as the strain gauge type sensor unit 100 of the sixth embodiment. In addition, the strain gauge type sensors 204 to 206 are arranged around the origin O' at regular angular intervals of 120 degrees. Therefore, because multiaxial forces and moments can be measured by three strain gauge type sensors, this can simplify the construction of the strain gauge type sensor unit.

Hereinbefore, preferred embodiments of the present invention have been described. However, the present invention is never limited to the above-described embodiments, and various changes in design can be made within the scope of the claims. For example, in the above-described first to seventh embodiments, the quantities of changes in resistance value of four strain gauges linearly arranged are substantially equal to each other. However, the present invention is not limited to that. It suffices if any of the resistance values of four strain gauges changes widely.

In the above-described first to seventh embodiments, a driving method is adopted in which a constant voltage and GND are applied to each bridge circuit. However, the present invention is not limited to that. Each bridge circuit may be driven by applying both of positive and negative voltages. Or, each bridge circuit may be driven by applying a constant current in place of the constant voltage.

It is a matter of course that the arrangement of strain gauges in the above-described first to seventh embodiments is not limited to those shown in the figures. Even in the case that the arrangement of strain gauges is changed, it suffices if strains at positions where the strain gauges linearly arranged in each strain gauge group are disposed, are equal to each other in magnitude, and 3- or 6-axial forces and moments can be obtained by calculation such as subtraction and addition of voltages at nodes in bridge circuits.

In the above-described embodiments, the present invention is applied to a sensor for detecting 3- or 6-axial forces and moments. However, the present invention is not limited to that. The present invention may be applied to a sensor for detecting only 2-axial forces on the X- and Y-axes.

INDUSTRIAL APPLICABILITY

The present invention is the most suitable for a strain gauge type sensor capable of measuring the direction and magnitude of at least one of six components of forces on orthogonal three axes and moments around the respective axes, externally applied. Therefore, for example, in a humanoid robot expected to be put to practical use in the amusement field, if a strain gauge type sensor of the present invention is incorporated in a hand or leg of the humanoid robot, forces and moments applied to the hand or leg of the humanoid robot can be detected with high responsibility and high accuracy at a lower cost than a conventional sensor.

A cross-sectional view of a strain gauge type sensor according to a first embodiment of the present invention.

FIG. 2

Figure 1:
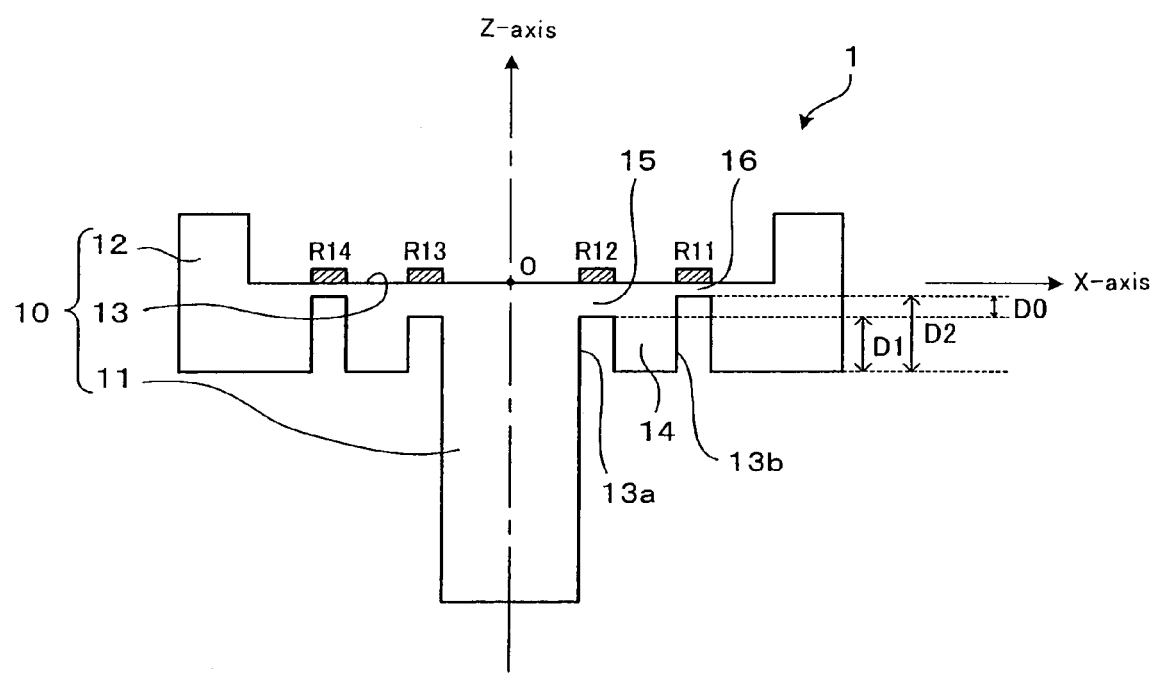
FIG. 1
Figure 2:
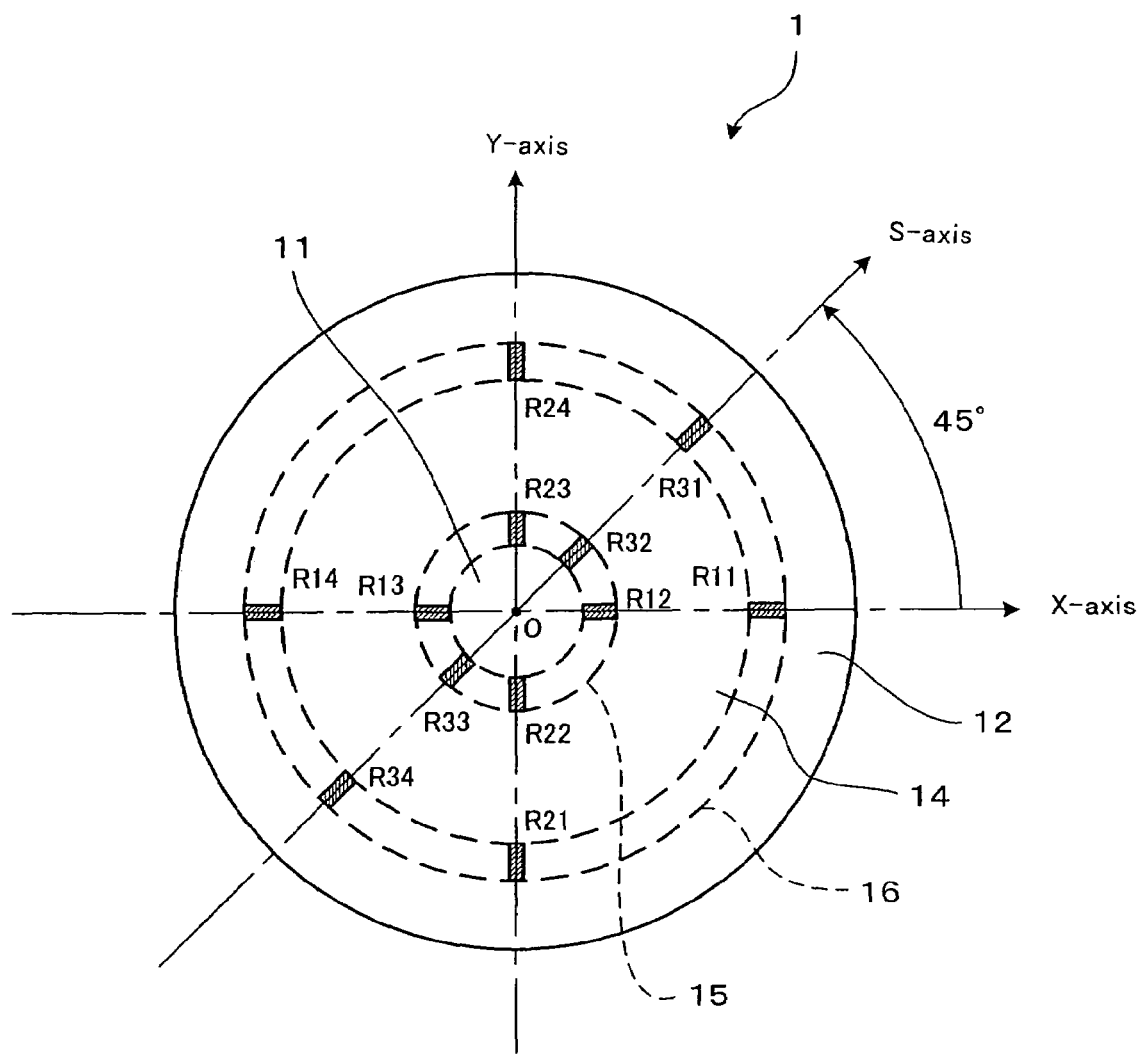
Figure 3:
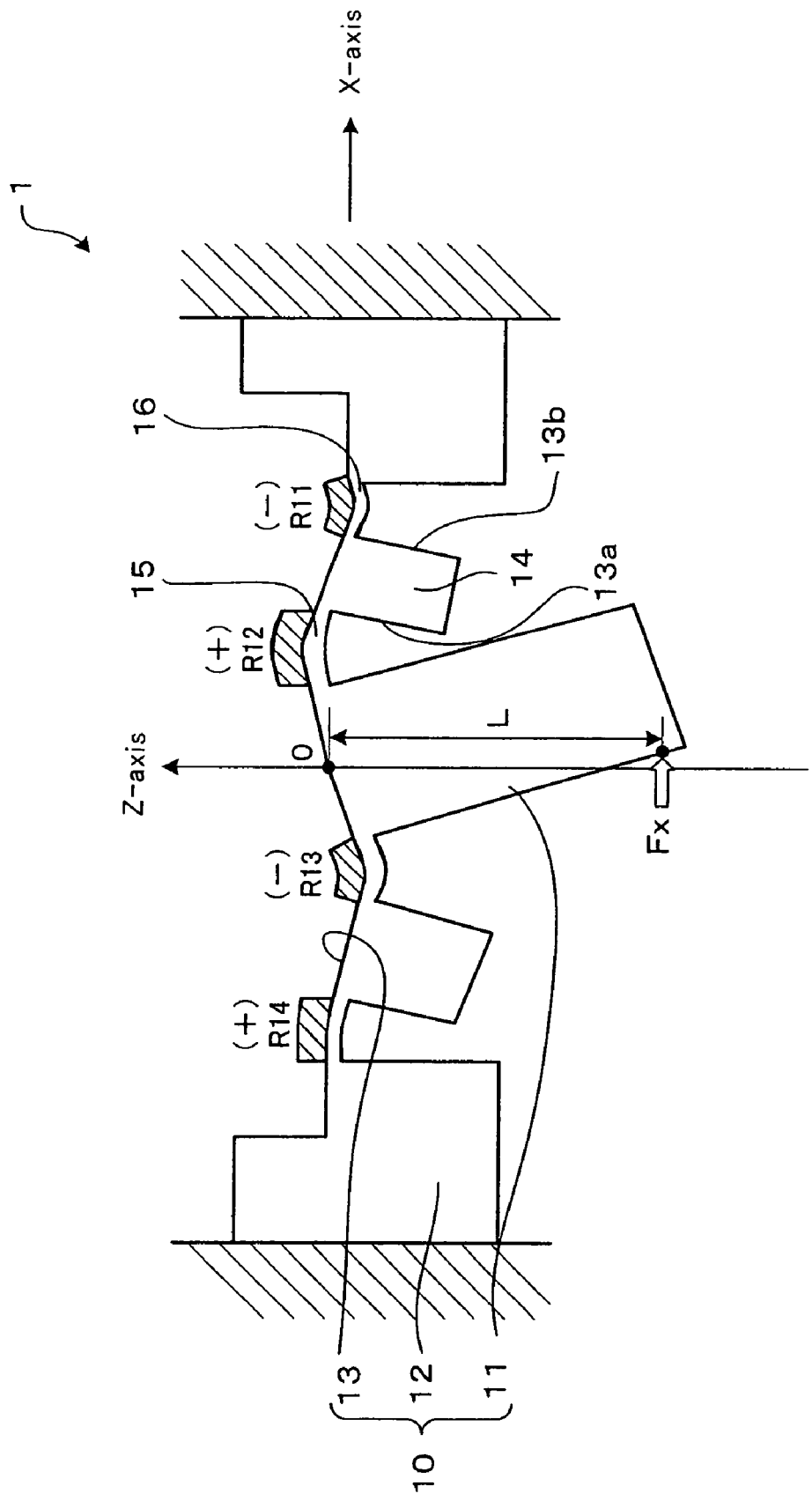
Figure 4:
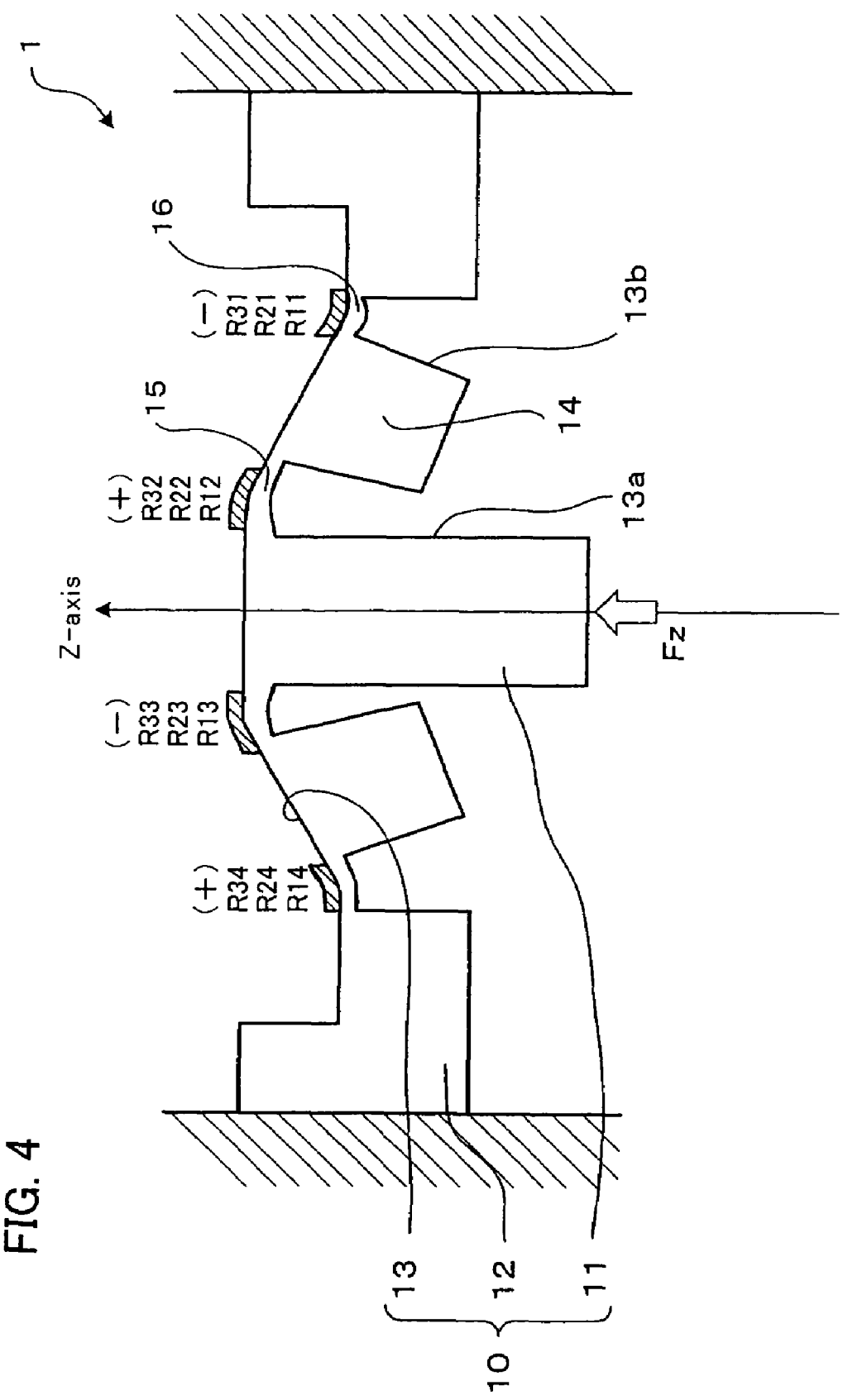

An upper view of the strain gauge type sensor of FIG. 1.

FIG. 3

A cross-sectional view showing a state of the strain gauge type sensor of FIG. 1 and changes in resistance value of strain gauges when an X-axial positive force is applied to a force receiving portion of the strain gauge type sensor.

FIG. 4

A cross-sectional view showing a state of the strain gauge type sensor of FIG. 1 when a Z-axial positive force is applied to the force receiving portion of the strain gauge type sensor.

FIG. 5A

A circuit diagram showing an example of a bridge circuit of the strain gauge type sensor of FIG. 1.

FIG. 5b

A circuit diagram showing an example of a bridge circuit of the strain gauge type sensor of FIG. 1.

FIG. 5C

A circuit diagram showing an example of a bridge circuit of the strain gauge type sensor of FIG. 1.

FIG. 6

Figure 5A:
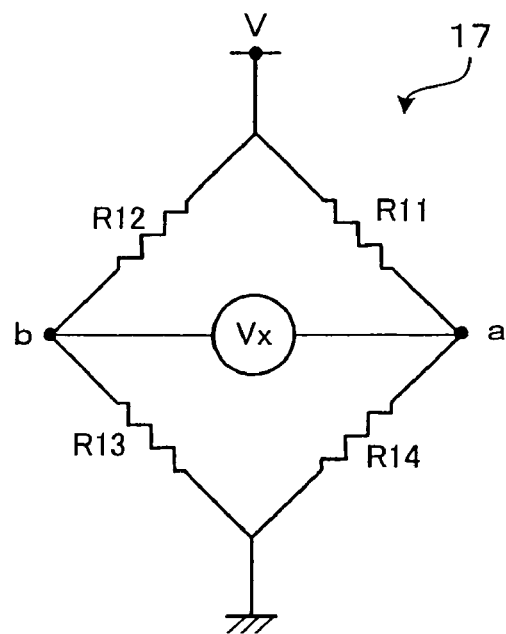
Figure 5B:
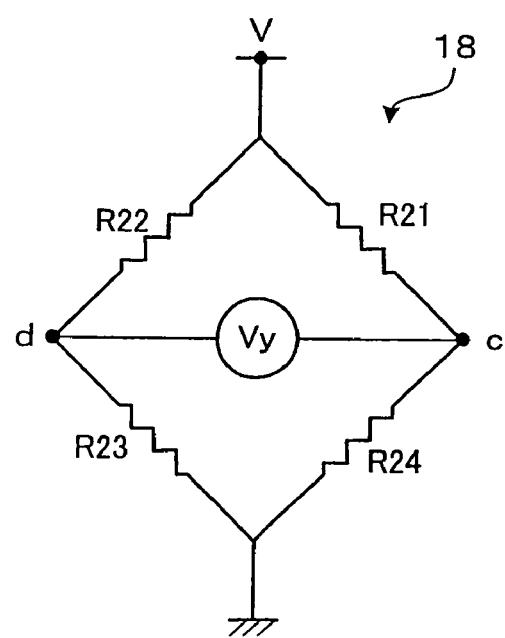
Figure 5C:
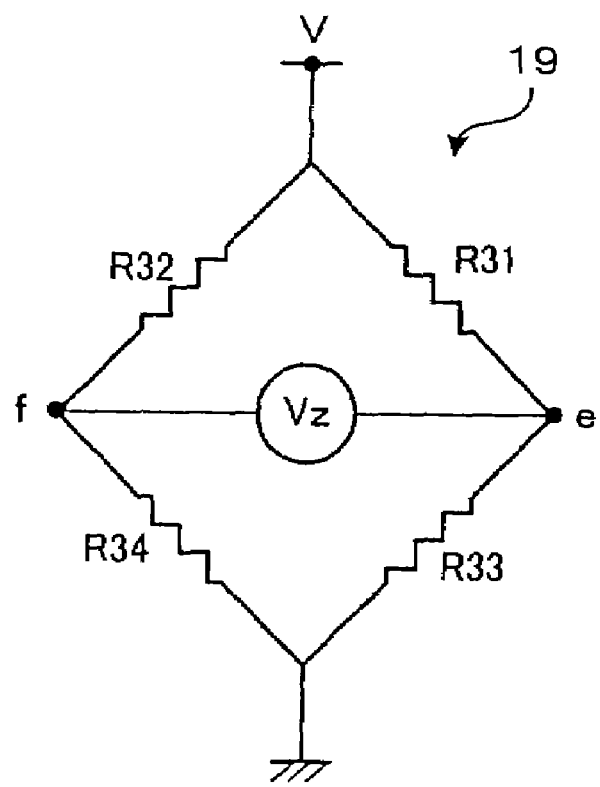
Figure 6:
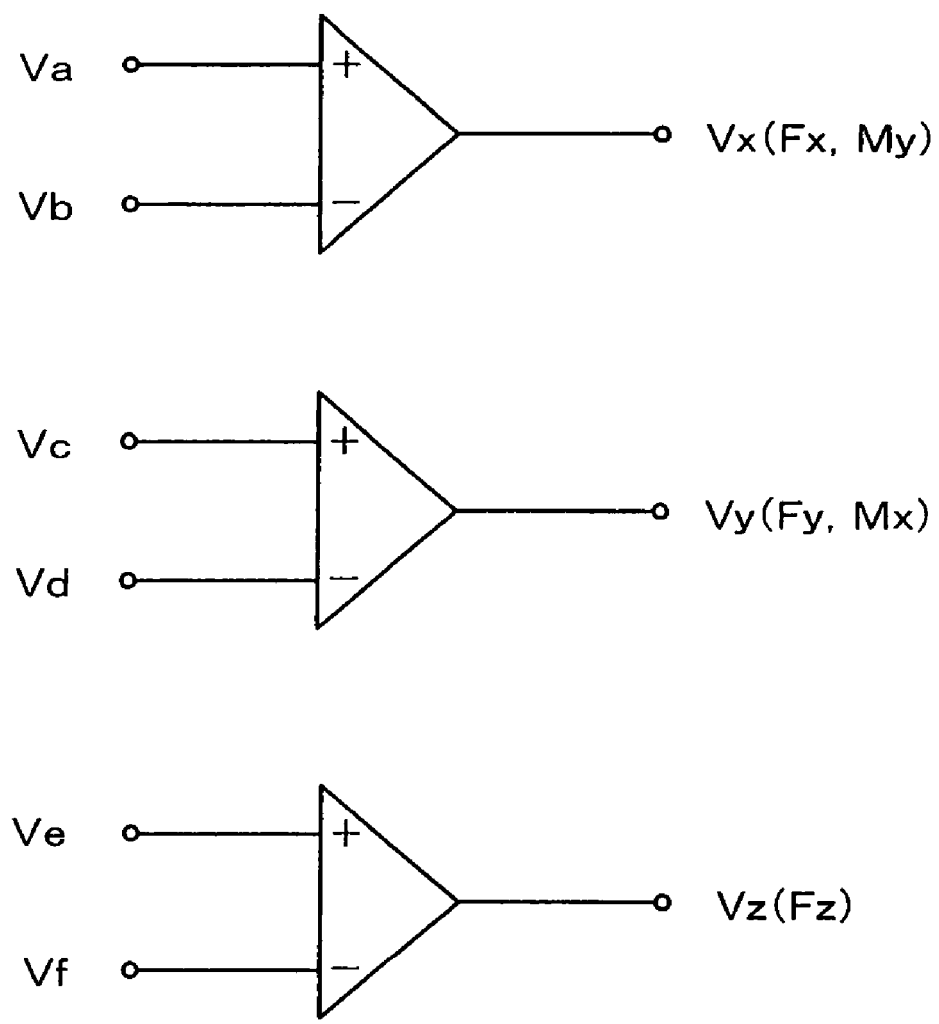
Figure 7:
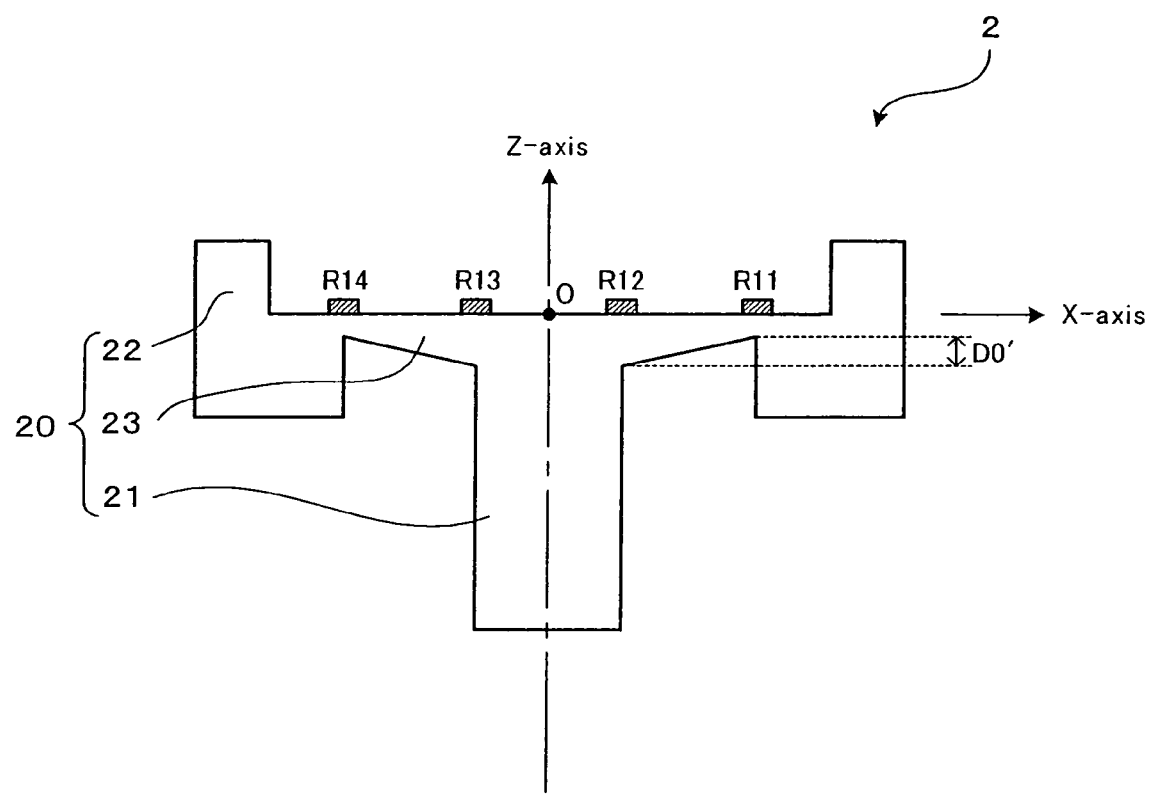
Figure 8:
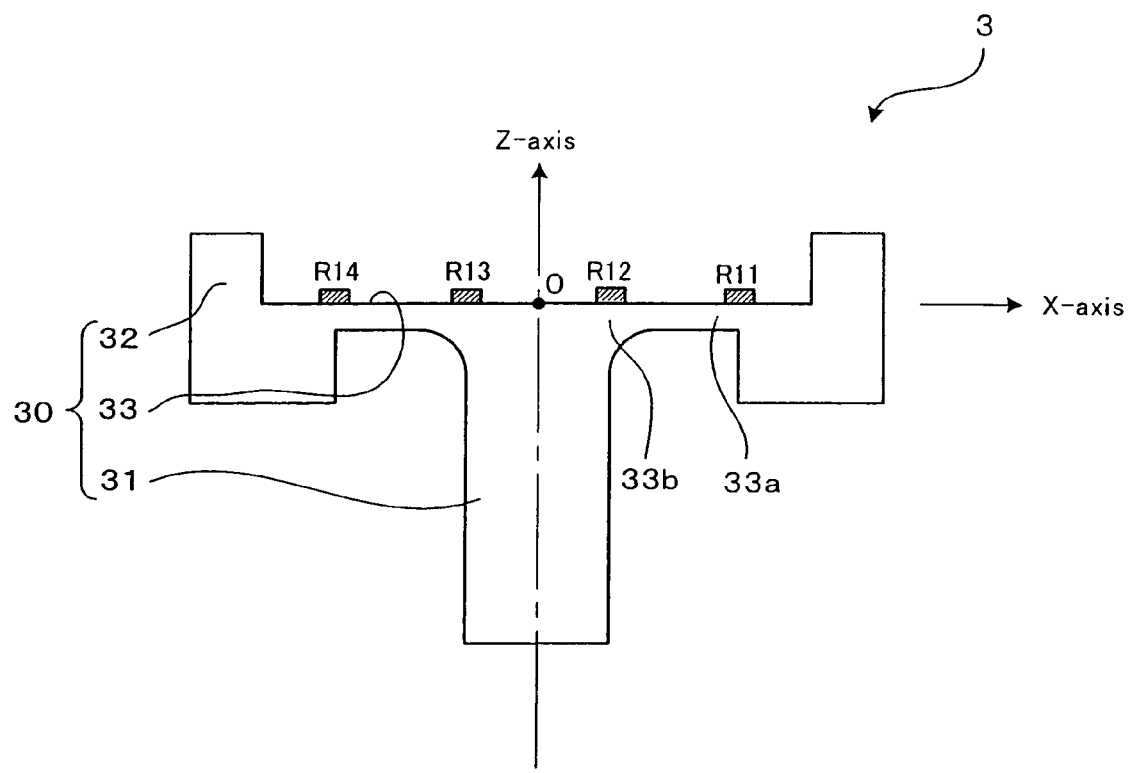
Figure 9:
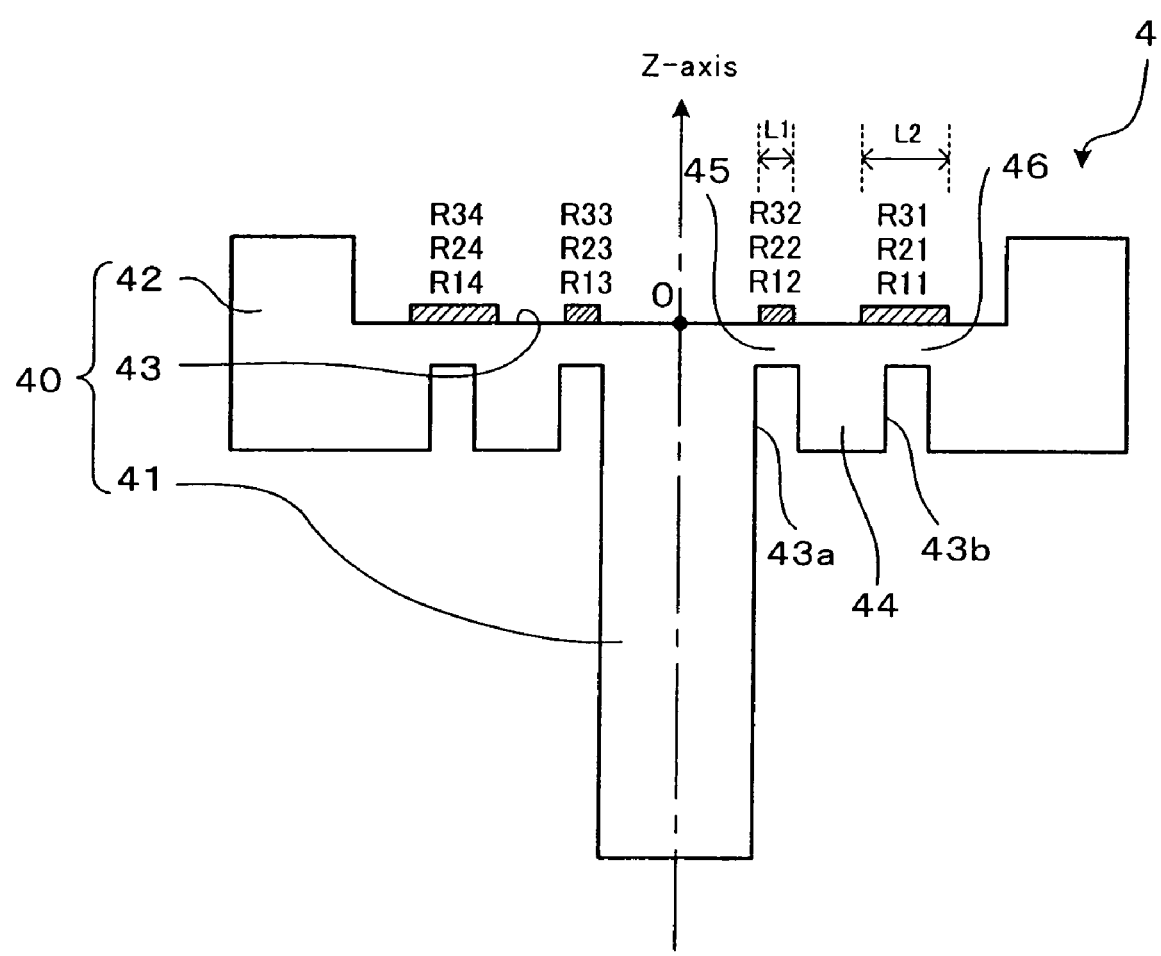
Figure 10:
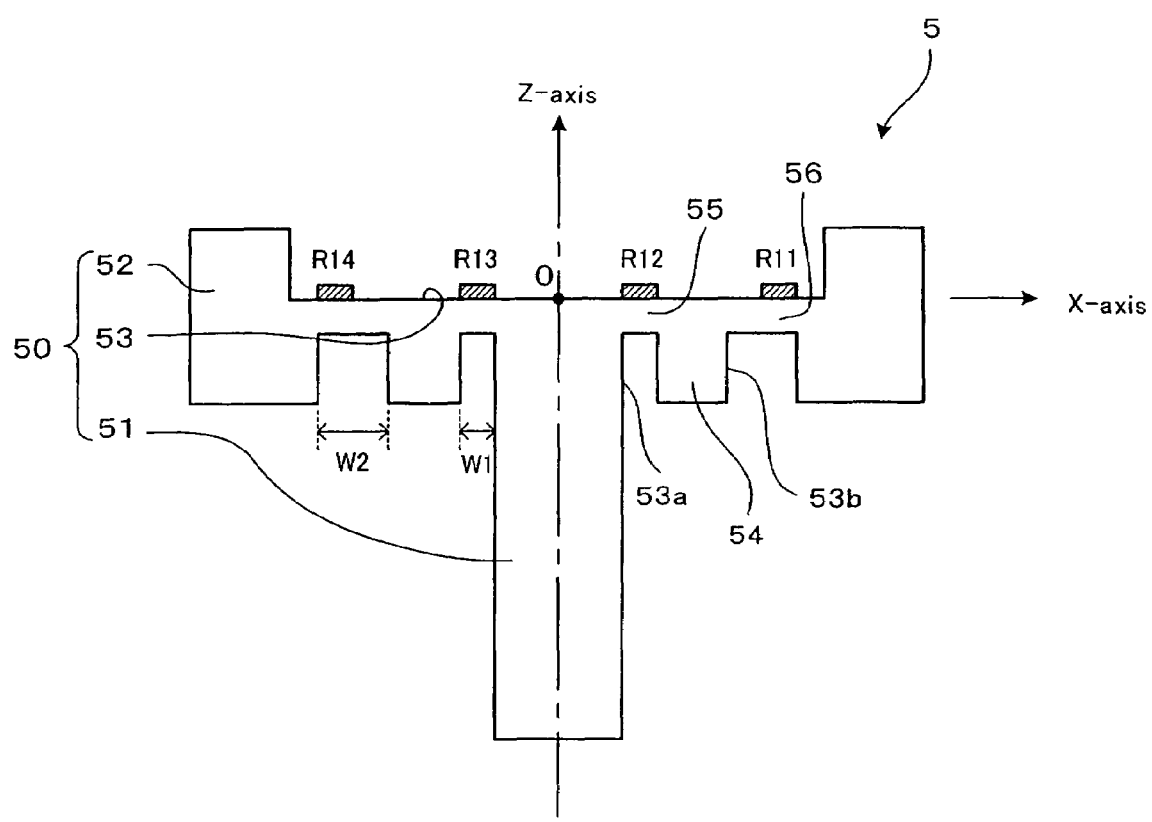

A representation showing an example of calculation processing for node voltages of the bridge circuits shown in FIGS. 5.

FIG. 7

A cross-sectional view of a strain gauge type sensor according to a second embodiment of the present invention.

FIG. 8

A cross-sectional view of a strain gauge type sensor according to a third embodiment of the present invention.

FIG. 9

A cross-sectional view of a strain gauge type sensor according to a fourth embodiment of the present invention.

FIG. 10

A cross-sectional view of a strain gauge type sensor according to a fifth embodiment of the present invention.

FIG. 11

A view showing the arrangement of strain gauges provided on a surface of a first member of a strain gauge type sensor unit according to a sixth embodiment of the present invention.

FIG. 12

Figure 11:
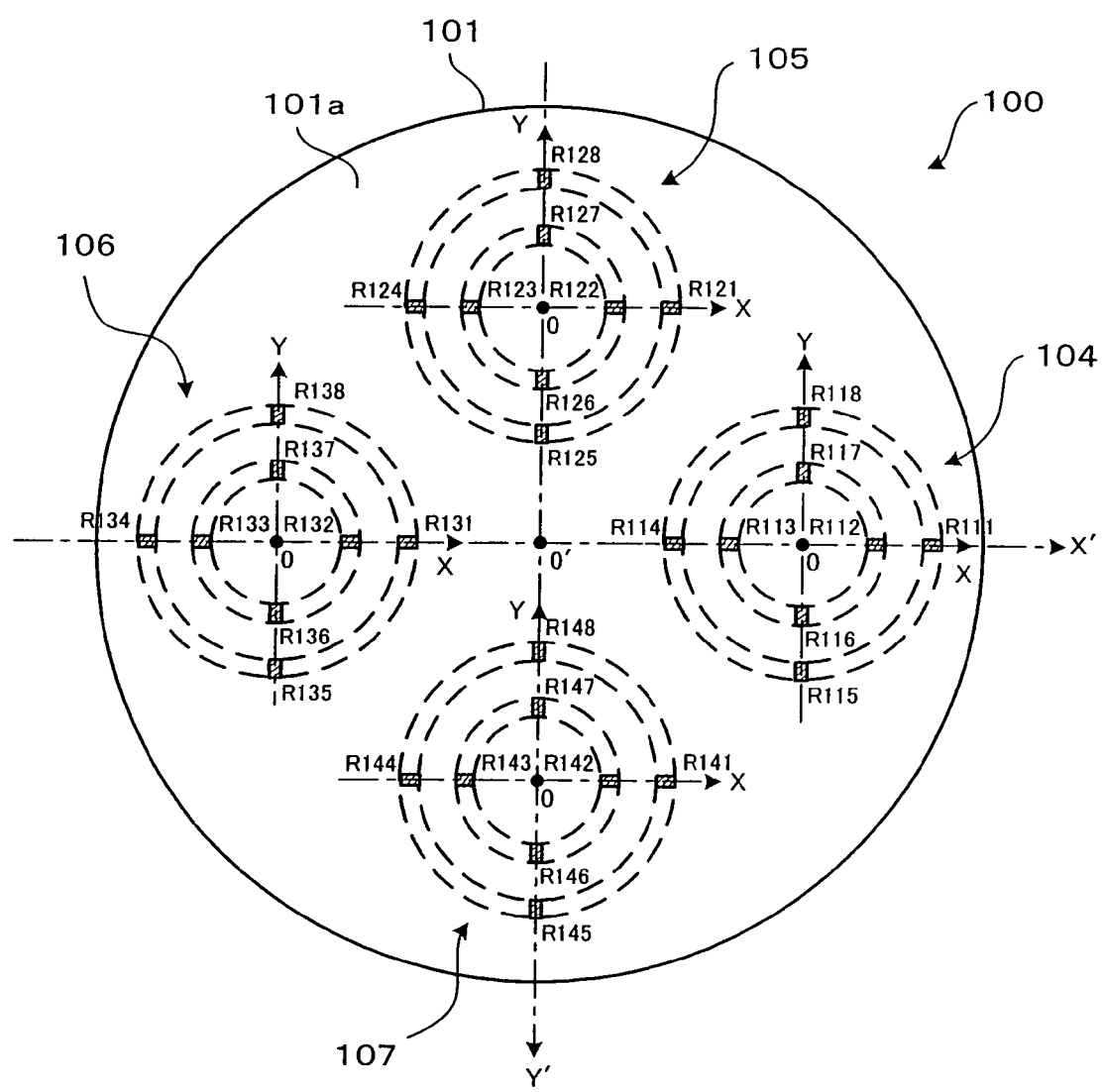
Figure 12:
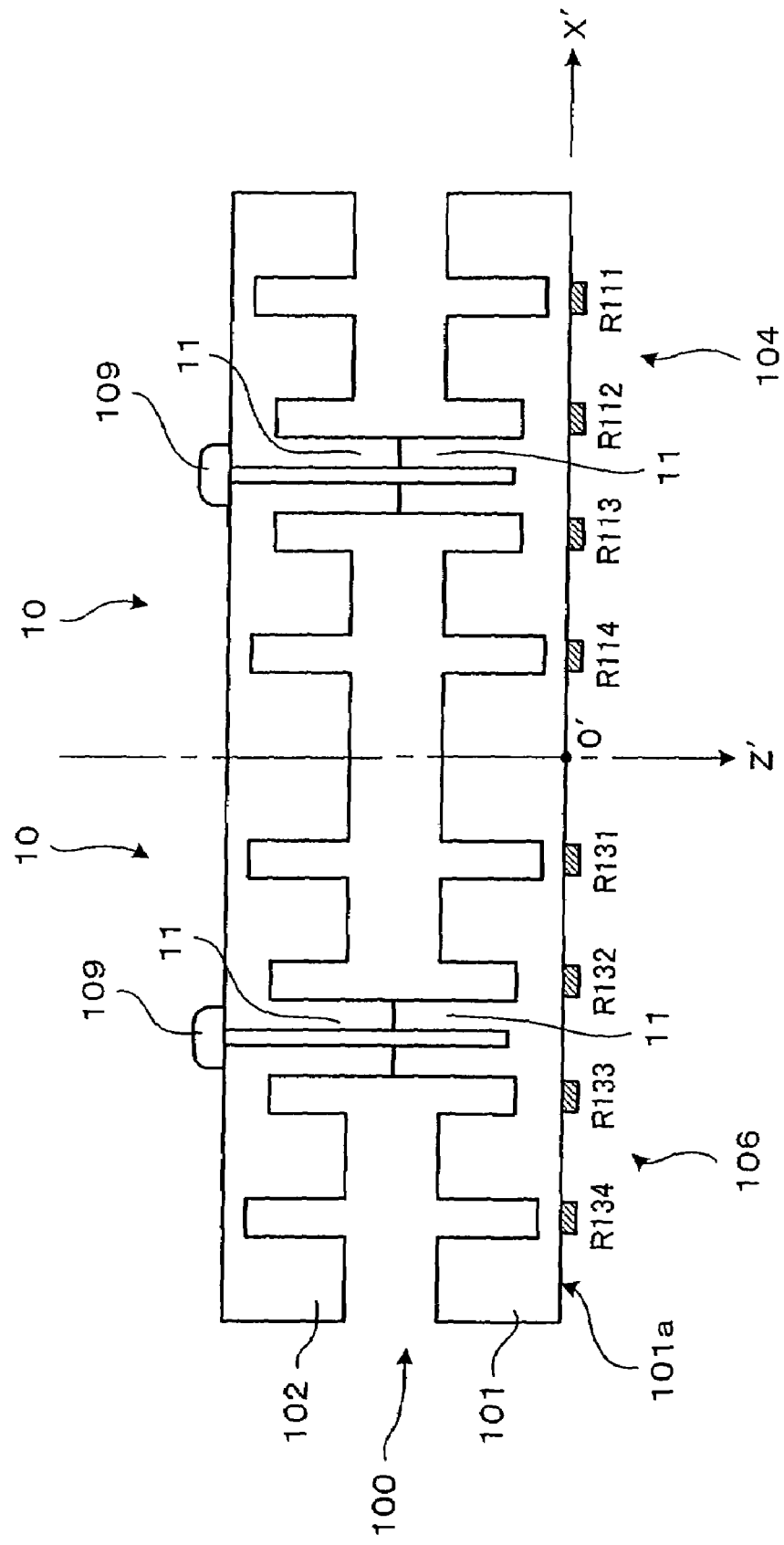
Figure 13:
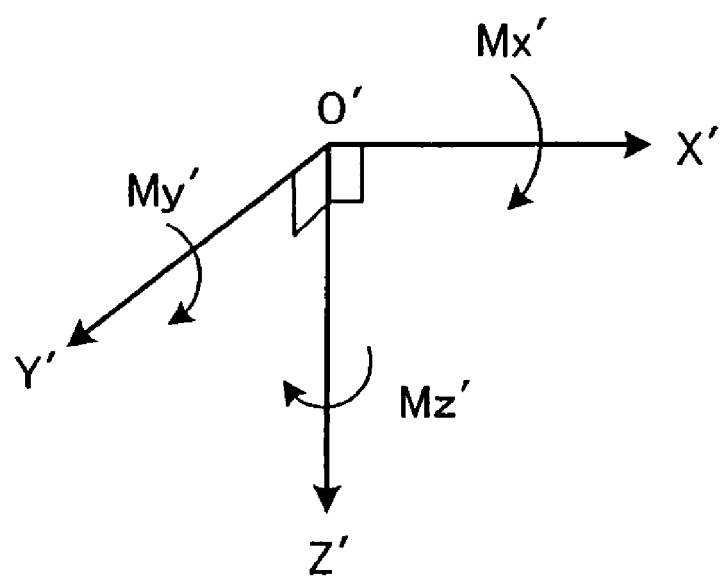
Figure 14:
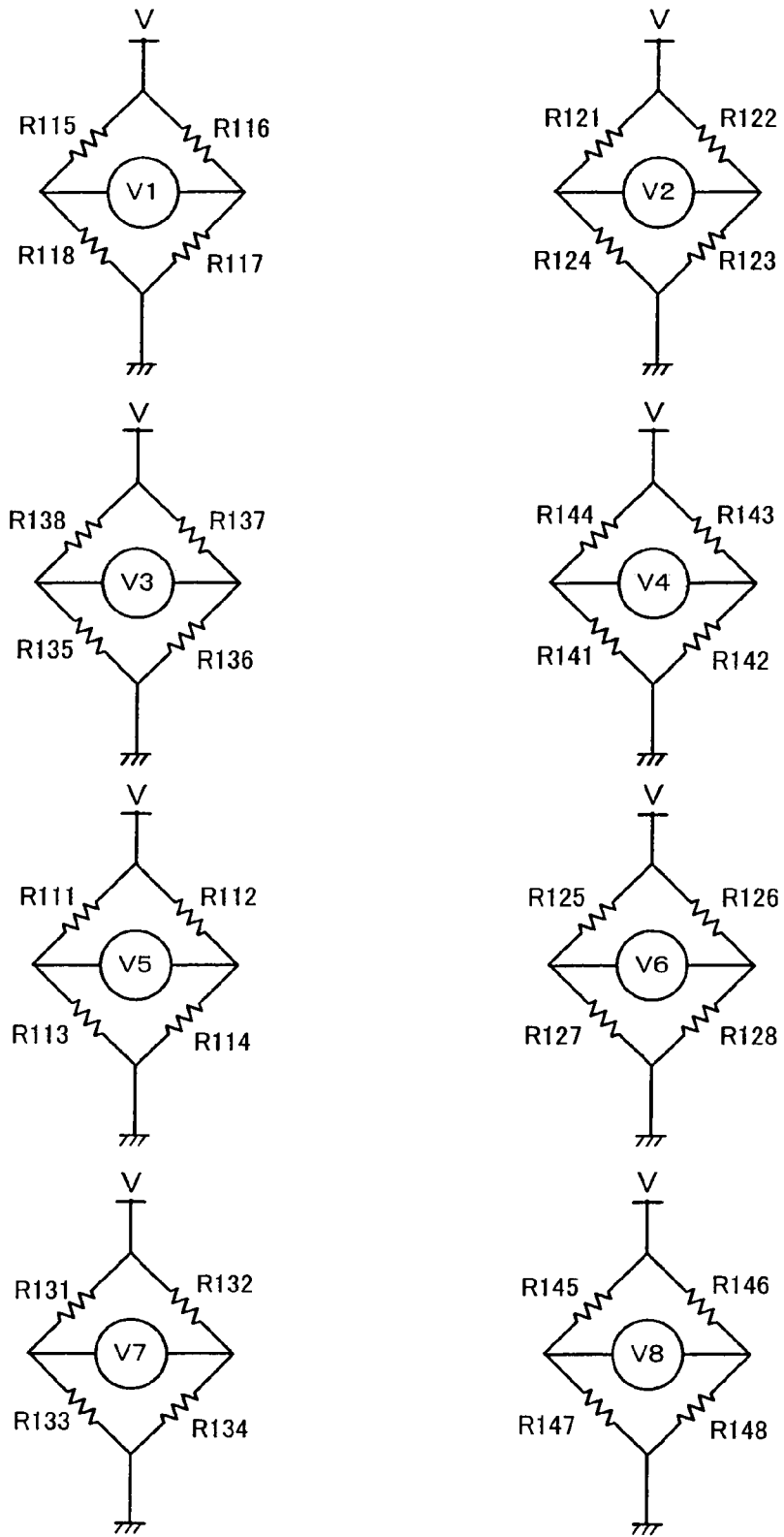
Figure 15:
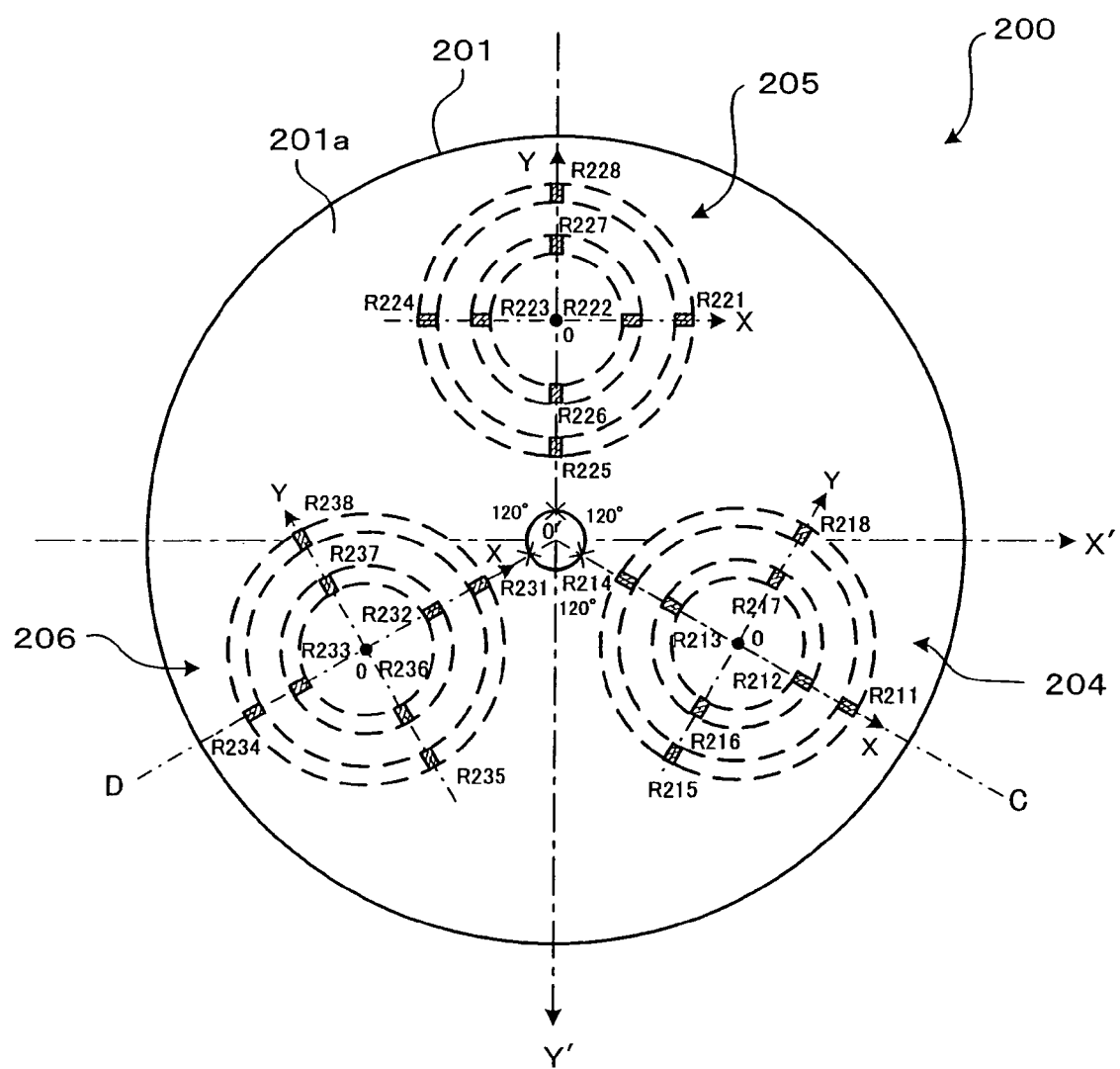

A cross-sectional view of the strain gauge type sensor unit shown in FIG. 11.

FIG. 13

A perspective representation showing a Cartesian coordinate system.

FIG. 14

Circuit diagrams showing examples of bridge circuits of the strain gauge type sensor unit shown in FIG. 11.

FIG. 15

A view showing the arrangement of strain gauges provided on a surface of a first member of a strain gauge type sensor unit according to a seventh embodiment of the present invention.

FIG. 16

A cross-sectional view of a prior art strain gauge type sensor.

FIG. 17

Figure 16:
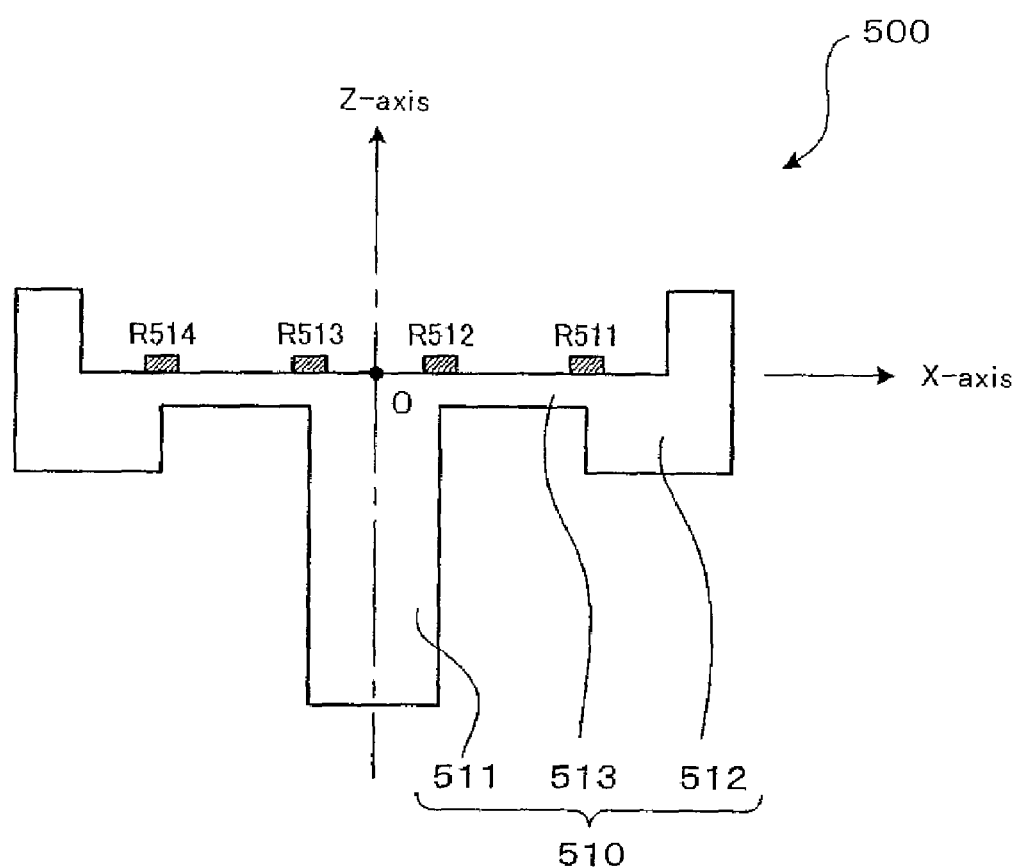
Figure 17:
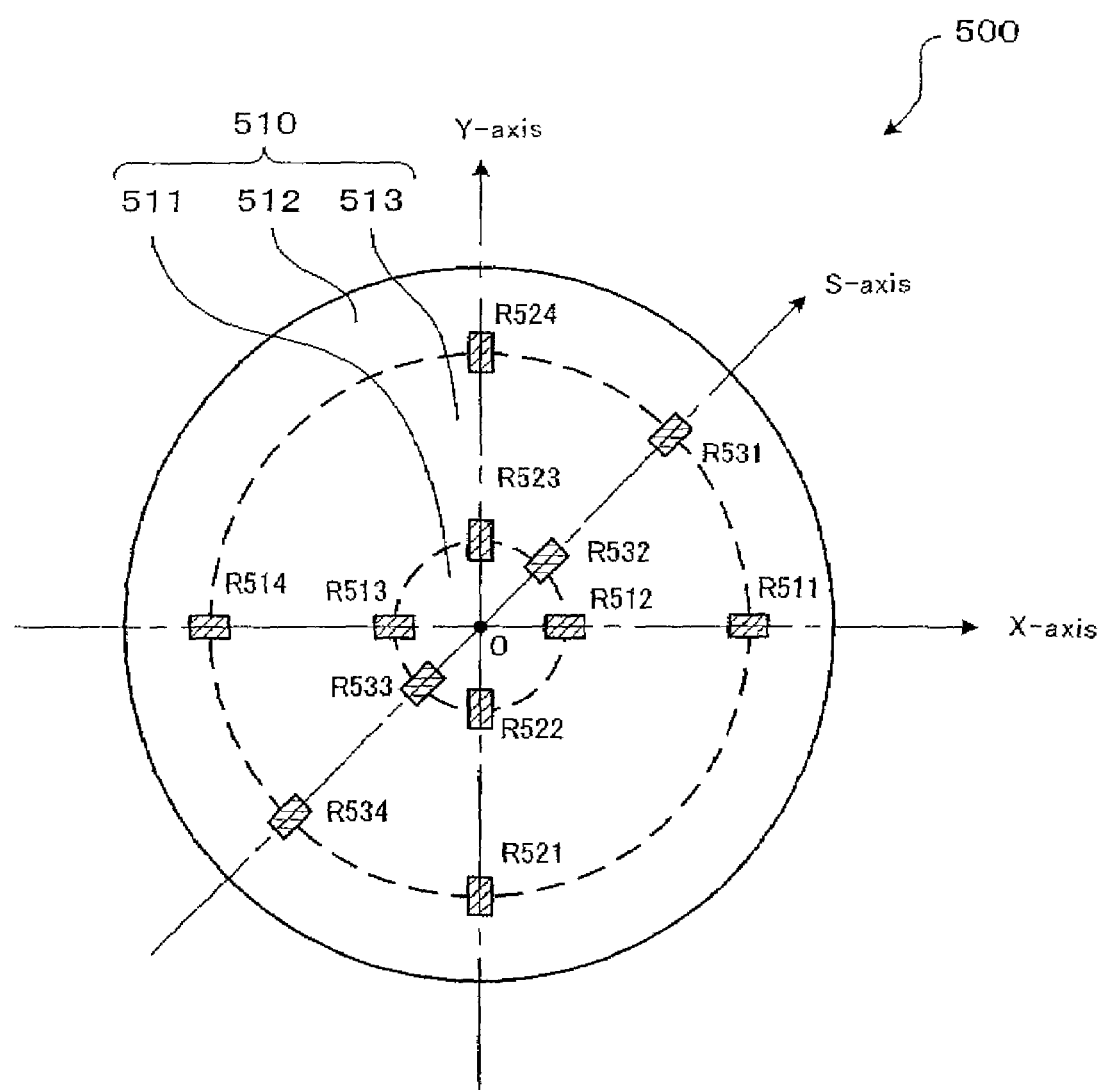
Figure 18A:
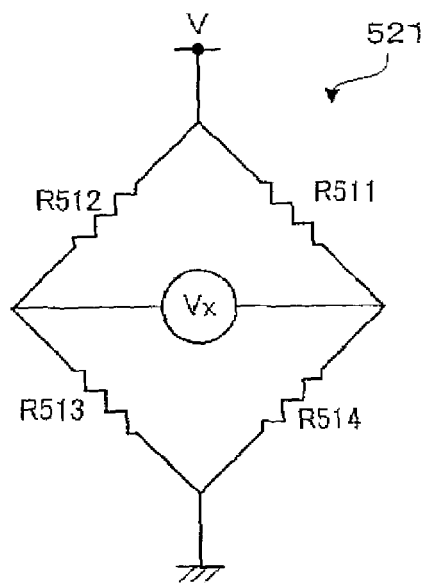
Figure 18B:
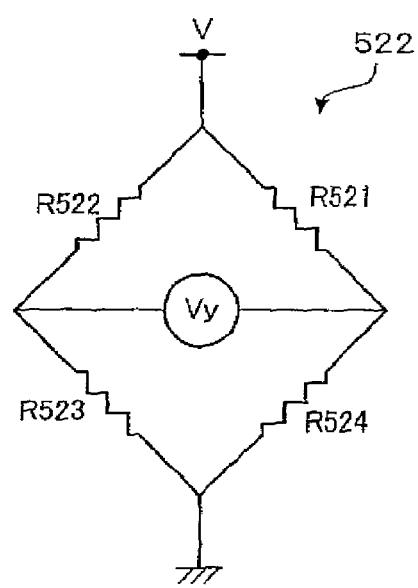
Figure 18C:
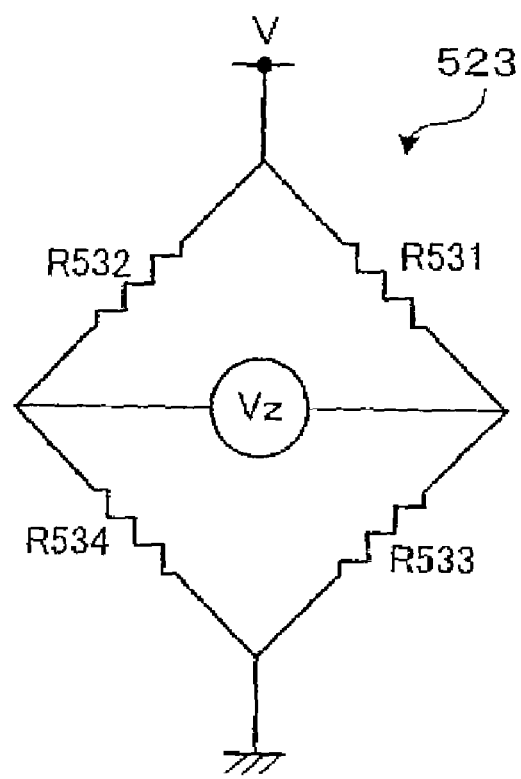
Figure 19:
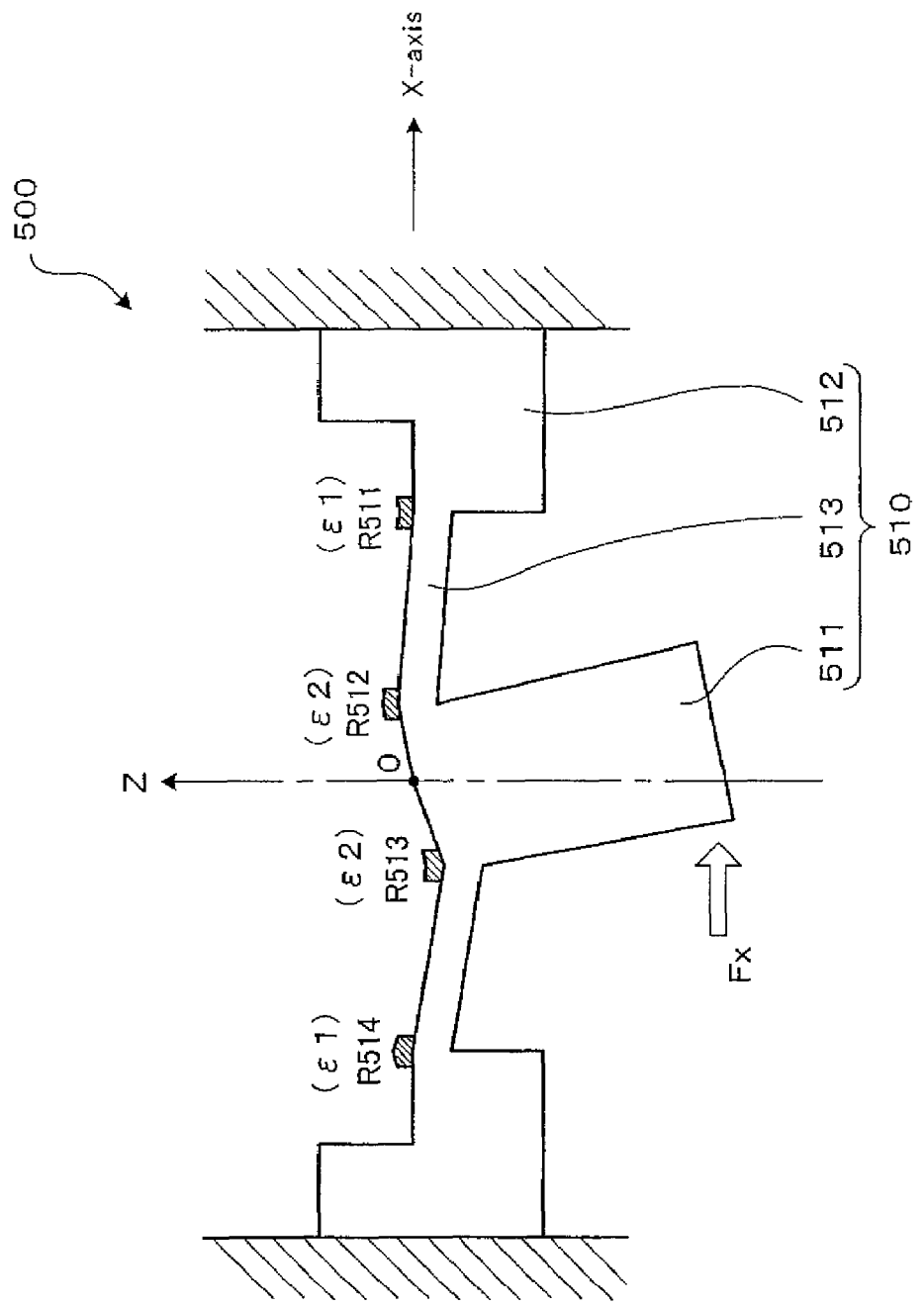

An upper view of the strain gauge type sensor of FIG. 16.

FIG. 18A

A circuit diagram showing an example of a bridge circuit of the strain gauge type sensor of FIG. 16.

FIG. 18B

A circuit diagram showing an example of a bridge circuit of the strain gauge type sensor of FIG. 16.

FIG. 18C

A circuit diagram showing an example of a bridge circuit of the strain gauge type sensor of FIG. 16.

FIG. 19

A cross-sectional view showing a state of the strain gauge type sensor of FIG. 16 when an X-axial positive force is applied to a force receiving portion of the strain gauge type sensor.

DESCRIPTION OF REFERENCE NUMERALS 1, 2, 3, 4, 5, 104 to 107, 204 to 206: strain gauge type sensor
10, 20, 30, 40, 50: strain generation body
11, 21, 31, 41, 51: force receiving portion
12, 22, 32, 42, 52: fixed portion
13, 23, 33, 43, 53: interconnecting portion
17 to 19: bridge circuit
100, 200: strain gauge type sensor unit
101, 201: first member
102: second member
15, 16, 45, 46, 55, 56: diaphragm
R11 to R34, R111 to R148, R211 to R238: strain gauge

The invention claimed is:

1. A strain gauge type sensor characterized in that the sensor comprises:
a strain generation body comprising a force receiving portion to which a force is applied, a fixed portion fixed to a supporting body, and an interconnecting portion that interconnects the force receiving portion and the fixed portion and in which strain is generated according to the force applied to the force receiving portion;
a first strain gauge disposed on the interconnecting portion of the strain generation body; and
a second strain gauge disposed on the interconnecting portion at a position nearer to the fixed portion than the first strain gauge, and the interconnecting portion comprises:
a first diaphragm on which the first strain gauge is disposed;
a second diaphragm that is thinner than the first diaphragm on which the second strain gauge is disposed; and
a connecting portion that is thicker than the first diaphragm and connects the first and second diaphragms to each other.

2. The strain gauge type sensor according to claim 1, characterized in that at least one of the difference in thickness between the first and second diaphragms and the difference in length between the first and second diaphragms, is set such that the quantity of change in resistance value of the first strain gauge is substantially equal to the quantity of change in resistance value of the second strain gauge when a force is applied to the force receiving portion.

3. The strain gauge type sensor according to claim 1, characterized in that the sensor comprises two first strain gauges and two second strain gauges, and the first and second strain gauges are arranged on a single straight line.

4. The strain gauge type sensor according to claim 1, characterized in that the sensor comprises six first strain gauges and six second strain gauges, and each set of two first strain gauges and two second strain gauges are arranged on each of three straight lines different from each other.

5. The strain gauge type sensor according to claim 1, characterized in that the force receiving portion is columnar, and each of the fixed portion and the interconnecting portion is annular and disposed concentrically with the force receiving portion.

6. The strain gauge type sensor according to claim 1, characterized in that each of the strain gauges is made of a piezoresistive element.

7. A strain gauge type sensor unit characterized by comprising a plurality of strain gauge type sensors according to claim 1, on a single plane.

8. The strain gauge type sensor unit according to claim 7, characterized in that the plurality of strain gauge type sensors are arranged around a center point at regular angular intervals at the same distance from the center point.

9. The strain gauge type sensor unit according to claim 8, characterized in that the regular angular interval is 90 degrees.

10. The strain gauge type sensor unit according to claim 8, characterized in that the regular angular interval is 120 degrees.

11. A strain gauge type sensor characterized in that the sensor comprises:
a strain generation body comprising a force receiving portion to which a force is applied, a fixed portion fixed to a supporting body, and an interconnecting portion that interconnects the force receiving portion and the fixed portion and in which strain is generated according to the force applied to the force receiving portion;

a first strain gauge disposed on the interconnecting portion of the strain generation body; and a second strain gauge disposed on the interconnecting portion at a position nearer to the fixed portion than the first strain gauge, wherein a connecting portion between the force receiving portion and the interconnecting portion has a predetermined curvature, and a connecting portion between the fixed portion and the interconnecting portion has a curvature larger than the predetermined curvature.

12. The strain gauge type sensor according to claim 11, characterized in that the difference in curvature between the connecting portion between the force receiving portion and the interconnecting portion and the connecting portion between the fixed portion and the interconnecting portion, is set such that the quantity of change in resistance value of the first strain gauge is substantially equal to the quantity of change in resistance value of the second strain gauge when a force is applied to the force receiving portion.

13. A strain gauge type sensor characterized in that the sensor comprises:

a strain generation body comprising a force receiving portion to which a force is applied, a fixed portion fixed to a supporting body, and an interconnecting portion that interconnects the force receiving portion and the fixed portion and in which strain is generated according to the force applied to the force receiving portion;

a first strain gauge disposed on the interconnecting portion of the strain generation body; and a second strain gauge disposed on the interconnecting portion at a position nearer to the fixed portion than the first strain gauge, and wherein the first strain gauge is shorter than the second strain gauge.

14. The strain gauge type sensor according to claim 13, characterized in that the difference in length between the first and second strain gauges is set such that the quantity of change in resistance value of the first strain gauge is substantially equal to the quantity of change in resistance value of the second strain gauge when a force is applied to the force receiving portion.

15. A strain gauge type sensor characterized in that the sensor comprises:

a strain generation body comprising a force receiving portion to which a force is applied, a fixed portion fixed to a supporting body, and an interconnecting portion that interconnects the force receiving portion and The fixed portion and in which strain is generated according to the force applied to the force receiving portion;

a first strain gauge disposed on the interconnecting portion of the strain generation body; and a second strain gauge disposed on the interconnecting portion at a position nearer to the fixed portion than the first strain gauge, the interconnecting portion comprises:

a first diaphragm on which the first strain gauge is disposed;

a second diaphragm on which the second strain gauge is disposed; and a connecting portion that connects The first and second diaphragms to each other, and the first diaphragm is shorter than the second diaphragm.

16. The strain gauge sensor according to claim 15, characterized in that the difference in length between the first and second diaphragms is set such that the quantity of change in resistance value of the first strain gauge is substantially equal to the quantity of change in resistance value of the second strain gauge when a force is applied to the force receiving portion.

* * * * *